United States Patent
Ito

(10) Patent No.: US 7,308,152 B2
(45) Date of Patent: Dec. 11, 2007

(54) IMAGE PROCESSING METHOD, APPARATUS, AND PROGRAM

(75) Inventor: Tsukasa Ito, Musashino (JP)

(73) Assignee: Konica Minolta Holdings, Inc., Tokyo (JP)

( * ) Notice: Subject to any disclaimer, the term of this patent is extended or adjusted under 35 U.S.C. 154(b) by 682 days.

(21) Appl. No.: 10/493,194

(22) PCT Filed: Oct. 22, 2002

(86) PCT No.: PCT/JP02/10934

§ 371 (c)(1),
(2), (4) Date: Apr. 19, 2004

(87) PCT Pub. No.: WO03/036939

PCT Pub. Date: May 1, 2003

(65) Prior Publication Data

US 2004/0252907 A1 Dec. 16, 2004

(30) Foreign Application Priority Data

Oct. 26, 2001 (JP) ............................ 2001-329205

(51) Int. Cl.
*G06K 9/40* (2006.01)

(52) U.S. Cl. ...................... 382/260; 382/162; 382/166; 382/248

(58) Field of Classification Search ............... 382/260, 382/162, 166, 248, 249, 250, 173; 375/240.23, 375/240.14

See application file for complete search history.

(56) References Cited

U.S. PATENT DOCUMENTS

| 4,812,903 | A | | 3/1989 | Wagensonner et al. ...... 358/521 |
| 5,122,873 | A | * | 6/1992 | Golin ..................... 375/240.23 |
| 5,805,225 | A | * | 9/1998 | Tahara et al. ........... 375/240.14 |
| 6,445,831 | B1 | | 9/2002 | Arai ............................. 382/254 |
| 6,859,554 | B2 | * | 2/2005 | Porikli et al. ................ 382/173 |

FOREIGN PATENT DOCUMENTS

EP 0 726 672 A 8/1996

(Continued)

OTHER PUBLICATIONS

S. Inowe et al: "Learning Practical Image Processing by C Programming Language" published by Ohmsha, Windows/Macintosh/X-Window, pp. 54-59, unknown, date.

*Primary Examiner*—Anh Hong Do
(74) *Attorney, Agent, or Firm*—Frishauf, Holtz, Goodman & Chick, P.C.

(57) ABSTRACT

An image processing method, having the steps of: transforming color image signals representing an original image into a luminance signal and color difference signals; transforming the luminance signal and the color difference signals separately into multi-resolution signals of the level 1 to the level N; applying an inverse multi-resolution transform to the color difference multi-resolution signals, after suppressing the high-frequency components of the level 1 of the color difference multi-resolution signals; applying an inverse multi-resolution transform processing to the luminance multi-resolution signals, after applying a coring processing using a condition for each level different from other levels to the high-frequency signals of each level of the luminance multi-resolution signals; transforming the processed luminance signal and the processed color difference signals into a set of processed color image signals.

54 Claims, 20 Drawing Sheets

FOREIGN PATENT DOCUMENTS

| | | |
|---|---|---|
| EP | 1 137 258 A | 9/2001 |
| JP | 63-026783 | 2/1988 |
| JP | 06-274615 | 9/1994 |
| JP | 09-022460 | 1/1997 |
| JP | 09-212623 | 8/1997 |
| JP | 11-266358 | 9/1999 |
| JP | 2000-215307 | 8/2000 |
| JP | 2000-224421 | 8/2000 |
| JP | 2001-189866 | 7/2001 |
| JP | 2001-223899 | 8/2001 |

\* cited by examiner

IMAGE PROCESSING METHOD, APPARATUS, AND PROGRAM

This application is a U.S. National Phase Application under 35 USC 371 of International Application PCT/JP02/10934 filed Oct. 22, 2002.

TECHNICAL FIELD

This invention relates to a processing method and processing apparatus of a color image, and in particular, to a processing method which can be applied to an image processing method and an image processing apparatus to be applied to an image which has been made a set of image signals by the scanning of a color photograph.

BACKGROUND ART

It is put into practice that an image formed on a color photographic film is photoelectrically read by a CCD sensor or the like, to be converted into a set of image signals. This set of image signals, after being undergone various kinds of image processing represented by negative-to-positive reversing, luminance adjustment, color balance adjustment, granular noise removal, and sharpness enhancement, are distributed through a medium such as a CD-R, a floppy disk, or a memory card, or an Internet line, and outputted as a hard copy image by a silver halide photographic paper, an ink jet printer, a thermal printer, or the like, or displayed on a medium such as a CRT, a liquid crystal display, or a plasma display, to be appreciated.

Generally speaking, an image on a color photographic film is formed of the assembly of dye-clouds of various sizes. For this reason, by the observation of the image enlarged, it is found that mottled granular unevenness based on the various sizes of dye-cloud are present on areas which should originally be of a uniform color. As the result of this, in an image obtained by photoelectrically reading an image formed on a photographic film, a granular noise signal corresponding to the granular unevenness is contained. It has been a point of problem that this granular noise signal is remarkably strengthened especially with an image processing of sharpness enhancement, which degrades the quality of the image.

For a method of removing a noise included in an image signal, a method of smoothing by a smoothing filter or a median filter is widely known (for example, S. Inoue et al: "Learning Practical Image Processing by C Programming Language" (in Japanese) p. 54, published by Ohm Co., Ltd.).

In U.S. Pat. No. 4,812,903, it is proposed a technology for enhancing sharpness while suppressing granularity through it that a set of color image signals are transformed into a luminance signal and color information signals, the luminance signal is further decomposed into a low-frequency component and a high-frequency component, non-linear processing is applied to said low-frequency component of the luminance signal, an enhancement processing is applied to said high-frequency component of the luminance signal, and an adjustment processing is separately applied to said color information signals; after that, the low-frequency component of the luminance signal, the high-frequency component of the luminance signal, and the color information signals, which have been processed, are combined to become a set of processed color image signals.

Further, in the publication of the unexamined patent application S63-26783, it is proposed a technology for obtaining a natural enhancement processing with a small change of color tone through it that a set of inputted color image signals are transformed into a luminance signal and color information signals, spatially wide-ranging information is abstracted by the application of an averaging filter processing to said luminance signal, spatially detailed information is calculated from the difference between said luminance signal and said spatially wide-ranging information, and a specified transform processing is applied to each of said spatially detailed information and said spatially wide-ranging information; after that, the spatially detailed information, the spatially wide-ranging information, and said color information signals, which have been already processed, are combined to become a set of processed color image signals.

In the publication of the unexamined patent application H9-22460, it is proposed a technology for enhancing sharpness while suppressing granularity through it that an inputted image signal is decomposed into a low-frequency component, a medium-frequency component, and a high-frequency component, an enhancement processing is applied to said high-frequency component, while suppression processing being applied to said medium-frequency component, and the high-frequency component, the medium-frequency component, which have already been processed, and the low-frequency component are combined to become a processed image signal. Further, also it is proposed in the same publication a technology for suppressing the roughening of colors through abstracting a luminance component from the aforesaid high-frequency component and medium-frequency component in process of the above-mentioned processing, and practicing the above-mentioned enhancement/suppression processing and composition on the basis of said luminance component only.

In the publication of the unexamined patent application 2000-215307, it is proposed a technology for suppressing the roughening resulting from granularity and enhancing sharpness through it that a set of inputted color image signals of R, G, and B are decomposed into a low-frequency component, a medium-frequency component, and a high-frequency component, it is obtained a correlation value with respect to corresponding pixels between at least one color set composed of two colors out of the above-mentioned three colors R, G, and B of said medium-frequency component and/or said high-frequency component, a granularity detecting processing using a specified morphology operation is applied to the above-mentioned R, G, and B signals, and an enhancement processing is applied to said high-frequency component, while a suppression processing is applied to said medium-frequency component on the basis of evaluation values composed of the above-mentioned correlation value and the result of the granularity detecting processing using the above-mentioned morphology operation; then, the above-mentioned high-frequency component after the enhancement processing, the above-mentioned medium-frequency component after the suppression processing, and the above-mentioned low-frequency component are combined to compose a signal. Further, also it is proposed in said publication a technology such that, prior to the above-mentioned enhancement processing to the high-frequency component, from the aforesaid medium-frequency component and the aforesaid high-frequency component, a luminance signal concerning said medium-frequency component and a luminance signal concerning said high-frequency component are abstracted respectively, and the aforesaid enhancement processing to the high-frequency component is an enhancement processing to the luminance signal concerning the aforesaid high-frequency component, while the aforesaid suppression processing to the medium-frequency component is a suppression processing to the luminance signal concerning the aforesaid medium-frequency component.

In the publication of the unexamined patent application H11-266358, it is proposed a technology in which, in obtaining a set of processed image signals for reproducing a visible image from a set of digital original image signals representing a color image, a set of blur image signals representing a blur image of an original image are generated by applying a filtering processing with an edge-preserving smoothing filter to the above-mentioned set of digital original image signals, pixels to become the object of abstracting for the blur image are abstracted from this set of blur image signals, a specified area of the pixels of the object of abstracting of the original image corresponding to these pixels is abstracted, and a specified image processing is performed in accordance with this specified area.

In the publication of the unexamined patent application H6-274615, an image processing method to be applied to an image signal representing a radiation image in reproducing a visible image of said radiation image from said image signal, characterized by comprising the steps of decomposing said image signal into signals of a plurality of frequency bands by applying a wavelet transform to said image signal with the second derivative of the smoothing function used as the basic wavelet function, detecting a zero point where the value of said signal becomes zero in the signal of the lowest frequency band among the signals falling in the range of the desired frequency range of said signals of the plurality of frequency bands, determining an enhancement coefficient having a larger value in the vicinity of said detected zero point than other areas, multiplying a signal of the frequency band higher by one step than said lowest frequency band by said enhancement coefficient, detecting a zero point where the value of said signal multiplied by said enhancement coefficient becomes zero, determining an enhancement coefficient having a larger value in the vicinity of said detected zero point than other areas, multiplying a signal of the frequency band higher by one step than said frequency band which is higher by one step than the lowest frequency band by said enhancement coefficient, carrying out said detection of a zero point, said determination of an enhancement coefficient, and said multiplication by said enhancement coefficient for all signals falling in the range of said desired frequency band, and applying an inverse wavelet transform to each of said signals multiplied by said enhancement coefficient and other signals.

In the publication of the unexamined patent application H9-212623, an image processing method characterized by obtaining a processed image signal through the steps of decomposing an image signal representing a radiation image into a plurality of frequency band image signals representing images of the respective frequency bands by transforming said image signal into signals of a multi-resolution space, applying a processing to make zero the value of signals having a lower absolute value than a specified threshold to specified frequency-band image signals out of said plural frequency-band image signals, and applying an inverse transform to the frequency-band image signals which have undergone said processing and other frequency-band signals.

In the publication of the unexamined patent application 2000-224421, it is proposed an image processing method characterized by obtaining a processed image signal through the steps of applying a noise abstraction processing to a specified frequency-band image signal of a specified frequency band obtained in the process of decomposing an image signal into a plurality of frequency-band signals representing images of the respective frequency bands by the application of a multi-resolution transform processing to said image signal, obtaining a processed frequency-band image signal by applying a noise removal processing to said specified frequency-band image signal on the basis of the result of said noise abstraction processing, obtaining a frequency-band image signal of a frequency band which is lower by one step than said specified frequency band by applying a multi-resolution transform processing to said processed frequency-band image signal, obtaining processed frequency-band image signals of the respective frequency bands by practicing repeatedly up to the desired frequency band the above-mentioned noise abstraction processing, the above-mentioned noise removal processing, and the above-mentioned multi-resolution transform processing using the frequency-band image signal of said frequency band lower by one step as the above-mentioned specified frequency-band image signal, and applying an inverse multi-resolution transform processing to said processed frequency-band image signals.

In the publication of the unexamined patent application 2001-189861, it is proposed a method of suppression processing of a still-standing grid for suppressing spatial frequency components corresponding to a still-standing grid image for use in an image processing method in which an image having a desired resolution can be obtained by transforming an original image including a still-standing grid image into an image represented in a multi-resolution space by repeatedly applying a filtering processing based on a specified filter to said original image, characterized by applying a wavelet transform to said original image in said filtering processing of at least the first stage, by means of a low pass filter having a characteristic such that the response of spatial frequency components of not less than 97% to the spatial frequency components of the still-standing grid image becomes not greater than 5%.

In the publication of the unexamined patent application 2001-223899, it is proposed an image processing method using coding and decoding of an image signal characterized by obtaining a processed image signal carrying a processed image through the steps of obtaining multi-resolution transform signals by the application of a multi-resolution transform processing to an image signal, obtaining processed transform signals carrying a processed image to which a desired image processing has been applied by the application of a coefficient transform processing corresponding to said desired image processing to said multi-resolution transform signals, obtaining processed coded data carrying said processed image by the application of a coding processing to said processed transform signals, decoding said processed coded data, and applying an inverse multi-resolution transform processing to the decoded data.

However, because the noise removal based on a simple filter processing which is widely known is accompanied by the lowering of image sharpness, a satisfactory image cannot be obtained. In a technology disclosed in U.S. Pat. No. 4,812,903 or in a technology disclosed in the publication of the unexamined patent application S63-26783, although some effect can be recognized in the suppression of granular noise being made worse in a sharpness enhancing process, it is not sufficient, and it cannot be expected to suppress a granular noise for a signal before the processing.

The method disclosed in the publication of the unexamined patent application H9-22460 has an effect to eliminate granular unevenness looking mottled in an image by selectively suppressing a medium-frequency component in which a granular noise is mainly present, but because the information on the image structure which is present in the medium-frequency component is suppressed at the same time, for example, it tends to happen that the shade in the periphery of the bridge of the nose and that around the eyes are suppressed to give an impression of blurred image of the face. If the high-frequency component is remarkably enhanced for compensating this impression of blur, the image becomes unsightly due to the generation of fine noises looking like colors being out of registration in the flat areas such as the cheek.

According to the method proposed also in the publication of the unexamined patent application H9-22460 in which luminance component is abstracted from the high-frequency component and medium-frequency component, and enhancement/suppression processing and combining are practiced on the basis of said luminance component only, the noise looking like colors being out of registration is not generated, but a subtle variation in a reddish color of the skin etc. are also suppressed, which gives an impression of smooth blank makeup face.

Further, in any one of the examples of the embodiment described in the publication of the unexamined patent application H9-22460, if it is attempted to enhance the sharpness in fine areas like hairs, the high-frequency component is excessively enhanced, and it is generated a noise looking as if fine powders are scattered over the whole image area. Further, there is another problem that, in order to separate a low-frequency component from an image signal as intended in the publication of the unexamined patent application H9-22460, it is necessary to apply a processing with a very large-sized low pass filter to every channel of the color signal representing the original image (for example, each of the signal channels of B, G, and R), which makes the load of calculation for the image processing very heavy; this is also a very big problem.

The method proposed in the publication of the unexamined patent application 2000-215307 eases somewhat the above-mentioned defect by dynamically controlling the degree of the suppression of the medium-frequency component and the degree of the enhancement of the high-frequency component in accordance with the situation, but it cannot be said that it is sufficient, and it follows the method which has the point of problem in the image quality as it is. From the viewpoint of the amount of calculation, it is needless to say that this method has a heavier load than that proposed in the publication of the unexamined patent application H9-22460.

The technology disclosed in the publication of the unexamined patent application H11-266358 is understood as a technology in which a specified area of image pixels of the object of abstracting corresponding to a specified photographic object such as the human skin or the blue sky is fixedly determined by the use of a blur image produced by the application of an edge-preserving smoothing filter to an original image, and an image processing is practiced under a special condition for the above-mentioned specified area determined. However, a processing by means of a large-sized low pass filter is required for the production of a blur image, which makes the load of calculation in the image processing heavy. Further, in the method of abstracting a specified photographic object using a blur image, it is difficult to discriminate, for example, "a blue-colored wall from the blue sky", or "the human skin from a beige-colored wall", and the accuracy of discrimination is highly insufficient.

The technology disclosed in the publication of the unexamined patent application H6-274615 is construed as an edge enhancing technology in which an image signal representing a radiation image undergoes a multi-resolution transform based on a wavelet transform, and a higher enhancement is applied to a high-frequency signal of the level n after transform with respect to a point where a high-frequency signal of the level (n+1) becomes zero than other portions. However, when this technology is applied to a color image, the RGB balance of a photographic object near the edge is broken and a false colored contour is produced, which makes the image very unsightly. On top of it, by the technology disclosed in the publication of the unexamined patent application H6-274615, it is impossible to reduce granular noises included in an image signal.

The technology disclosed in the unexamined patent application H9-212623 is construed as a noise removal technology to carry out what is called a hard coring processing in which an image signal representing a radiation image undergoes a multi-resolution transform, and out of the high-frequency signal values after transform, those signal values not greater than a threshold is made equally to be zero; however, if said technology is applied to a color image, the RGB balance in the vicinity of the edge of a photographic object is broken to produce a false-color contour, which makes the image very unsightly. The noise structure of an image signal obtained by the photoelectric reading of an image formed on a color photographic film by means of a CCD sensor or the like is different from that of a radiation image, and mottled granular unevenness based on the size of color-developing dye-clouds is predominant in it. If such a large threshold as to dissolve this mottled unevenness is set, the sharpness of the image is remarkably lowered; to state it in a reverse way, with such a small threshold as to maintain the sharpness of the image, mottled unevenness is not dissolved. For the above-mentioned reasons, it is impossible to use the technology disclosed in the publication of the unexamined patent application H9-212623 for a color image.

The technology disclosed in the publication of the unexamined patent application 2000-224421 is construed as a noise removal technology based on the repeating of an operation such that, in applying a multi-resolution transform to an image signal representing an image, a noise abstraction processing is applied to a low-frequency signal after the practice of a transform of the nth level, a noise removal processing is applied to said low-frequency signal under a condition based on the result of said noise abstraction, and after that, a transform of the (n+1)th level is applied to the above-mentioned processed low-frequency signal. If said technology is applied to a color image, RGB balance is broken in areas where mottled unevenness is dissolved to produce false-colored spots, which makes the image very unsightly. Further, every time at the transform of one level, it is necessary to repeat a noise abstraction processing and a noise removal processing, which makes the load of calculation very heavy.

Further, in the images for medical use which are supposed in the publication of the unexamined patent application 2000-224421, kinds of photographic object are limited and most of the images are comparatively monotonous; however on the other hand, it is characteristic of a color photographic image that there are present mixedly in the image, areas for which different image qualities are desired respectively such as an area where fine structures densely gather against a flat area, a light area against a dark area, etc., as observed in a personal portrait with a background of a wood. In an color image like this, it is necessary to change the condition of noise removal on the basis of the grasping of the area structure with a wide view of it; however, in the technology disclosed in the publication of the unexamined patent application 2000-224421, it is necessary to judge the condition of a noise removal processing of the nth-level resolution on the basis of the information of the nth-level resolution concerned; therefore, it is difficult to design an algorithm for determining the noise removal condition.

The technology disclosed in the publication of the unexamined patent application 2001-189866 can be construed as a technology to use, in applying a multi-resolution transform to a signal of an image including a still-standing grid image, a filter having a characteristic not to make the main spatial frequency components of a still-standing grid image substantially pass it in the first-level transform; however, this technology is effective only for the removal of a noise having a periodic uniform frequency response like a still-standing grid image, and it is not effective for the removal of a noise having a distribution in the shape and size with its spatial frequency components not concentrated in a particular band like a granular noise in a color photograph.

The technology disclosed in the publication of the unexamined patent application 2001-223899 can be construed as an image processing method based on the coding and decoding of an image signal such that, after a multi-resolution transform is applied to an image signal and a coefficient transform processing corresponding to the desired image processing to the processed signal, the signal is compressed and coded to produce data which are stored and transferred, and at the time of display of the image, the data are decoded and undergo an inverse multi-resolution transform. This technology is one to make the speed of calculation high by carrying out the image processing and coding processing parallel in preparing an image data file premised on the data compression based on a multi-resolution transform; however, in the field of the color photography, it is necessary to prepare a data file based on a common standard which does not use a multi-resolution transform such as a JPEG file or a TIFF file in response to the request of a user, and the method disclosed in the publication of the unexamined patent application 2001-223899 cannot make the speed of the calculation high. Further, if the technology of the publication of the unexamined patent application 2001-223899 is applied to a color image, it is produced a serious problem also in image quality that a false-color contour is produced in the vicinity of the edge of a photographic object or that false-color spots are produced in a flat portion.

It is an object of this invention to provide, on the basis of the above-mentioned situation, an image processing method and apparatus which give only a light load of calculation and are capable of suppressing a granular noise signal included in a color image signal as well as enhancing the sharpness of an image, while preserving the shade in the periphery of the bridge of the nose and that around the eyes, without producing a noise looking like colors being out of registration and a smooth expressionless makeup face, without producing a noise looking as if fine powders are scattered, and without producing a false-color contour in the vicinity of the edge or false-color spots in the flat portion.

DISCLOSURE OF INVENTION

An image processing method of the first of this invention is characterized by obtaining a processed image signal through the steps of a set of color image signals representing an original image are transformed into a luminance signal and color difference signals, transforming said luminance signal and said color difference signals separately into multi-resolution signals of the level 1 to the level N to make them luminance multi-resolution signals and color difference multi-resolution signals, after suppressing the high-frequency components of the level 1 of said color difference multi-resolution signals, applying an inverse multi-resolution transform to said color difference multi-resolution signals to make them processed color difference signals, after applying a coring processing using a condition for each level different from other levels to the high-frequency signals of each level of said luminance multi-resolution signals, applying an inverse multi-resolution transform processing to said luminance multi-resolution signals to make them a processed luminance signal, transforming said processed luminance signal and said processed color difference signals into a set of processed color image signals.

An image processing apparatus of the second of this invention is a processing apparatus for practicing an image processing method of the first of this invention, and is characterized by comprising means for transforming a set of color image signals representing an original image into a luminance signal and color difference signals, means for transforming said luminance signal and said color difference signals separately into multi-resolution signals of the level 1 to the level N to make them luminance multi-resolution signals and color difference multi-resolution signals, a transform means for applying an inverse multi-resolution transform to said color difference multi-resolution signals to transform them into processed color difference signals after suppressing the high-frequency signals of the level 1 of said color difference multi-resolution signals, means for applying a coring processing using a condition for each level different from other levels to the high-frequency signals of each level of said luminance multi-resolution signals, a transform means for applying an inverse multi-resolution transform to the luminance multi-resolution signals having already undergone said coring processing to transform them into a processed luminance signal, and a transform means for transforming said processed luminance signal and said processed color difference signals into a set of processed color image signals.

A program of the third of this invention is a program for making a computer practice an image processing method of the first of this invention, and is one to make a computer function as means for transforming a set of color image signals representing an original image into a luminance signal and color difference signals, means for transforming said luminance signal and said color difference signals separately into multi-resolution signals of the level 1 to the level N to make them luminance multi-resolution signals and color difference multi-resolution signals, a transform means for applying an inverse multi-resolution transform to said color difference multi-resolution signals to transform them into processed color difference signals after suppressing the high-frequency signals of the level 1 of said color difference multi-resolution signals, means for applying a coring processing using a condition for each level different from other levels to the high-frequency signals of each level of said luminance multi-resolution signals, a transform means for applying an inverse multi-resolution transform to the luminance multi-resolution signals having already undergone said coring processing to transform them into a processed luminance signal, and a transform means for transferring said processed luminance signal and said processed color difference signals into a set of processed color image signals.

In this invention, the term "to transform a set of color image signals into a luminance signal and color difference signals" means, for example, to transform a set of three color signals of B, G, and R of an original image into a set of signals of YIQ basis, HSV basis, YUV basis, etc. publicly known to persons specialized in the art, or to transform them into a set of signals of XYZ basis of CIE 1931 standard calorimetric system on the basis of the standard such as sRGB or NTSC, or into a set of signals of L★a★b★ basis, or L★u★v★ basis recommended by CIE 1976. Even though the transform into a luminance signal and color difference signals in this invention is not a perfectly strict transform, it exhibits a sufficient effect; therefore, it includes as an example of the embodiment, for example, a transform as described in an example of practice in the publication of the unexamined patent application S63-26783 such that the average value of B, G, and R signals are made to be the luminance signal and signals in respect of the two axes orthogonal to this are made to be the color difference signals.

Further, the term "a multi-resolution transform method" is a general name of a method represented by a wavelet transform method, a perfect-restructure filter bank method, a Laplacian pyramid method, etc., and is one to obtain multi-resolution signals by carrying out the separation of an input signal into a low-frequency component and a high-frequency component and a down-sampling (thinning out of pixels) through a transform operation of one time, and repeating the same operation for the low-frequency component obtained. Further, in the case where the multi-resolution signals obtained are subjected as it is to an inverse multi-resolution transform without undergoing any processing, the original input signal is completely restructured. This method is explained in detail, for example, in "Wavelet Analysis and Filter Bank" (authored by G. Strang and T. Nguyen, published by Baifukan Co., Ltd.).

The number of times of repeating the transform operation in the above-mentioned multi-resolution transform is called a level. As regards the way of naming the level, although there are some differences between persons specialized in the art, in this invention, the way of naming such that a signal of higher resolution is made one of the lower level is employed. That is, in the expression in this invention, the level zero represents an input signal, and the result of the application of a transform operation once to this is named the level 1, and the result of the application of the second transform operation to this result is named the level 2.

This invention does not limit the method of the multi-resolution transform to a certain one, but it is particularly desirable from the viewpoint of calculation efficiency to use a wavelet transform. The mode of a transform of one level in the case where a wavelet transform is used as a multi-resolution transform will be explained in more detail with reference to FIG. 1.

By applying a one-dimensional low pass filter LPF in the x direction to an input signal $S_n$, and further, thinning out the result of it by removing one out of every two by a down-sampling means 2⇓, a low-frequency component $SX_{n+1}$ which has a half resolution in the x direction to the input signal is obtained. Further, by applying a one-dimensional high pass filter HPF in the x direction to the input signal $S_n$, and further, thinning out the result of it by removing one out of every two by a down-sampling means 2⇓, a high-frequency component $WX_{n+1}$ which has a half resolution in the x direction to the input signal is obtained.

Next, by applying a one-dimensional low pass filter LPF in the y direction to the above-mentioned low-frequency component $SX_{n+1}$, and further, thinning out the result of it by removing one out of every two by a down-sampling means 2⇓, a low-frequency component $S_{n+1}$ which has a half resolution in the x direction and y direction to the input signal is obtained. In the same way, by applying a one-dimensional high pass filter HPF in the y direction to the low-frequency component $SX_{n+1}$, and further, thinning out the result of it by removing one out of every two by a down-sampling means 2⇓, a high-frequency component $Wh_{n+1}$ which has a half resolution in the x and y directions to the input signal is obtained. By applying the same operations also to the above-mentioned high-frequency component $WX_{n+1}$, high-frequency components $Wv_{n+1}$ and $Wd_{n+1}$ which have a half resolution in the x and y directions are obtained. By the above-mentioned operations, the input signal $S_n$ is transformed into 4 components $S_{n+1}$, $Wh_{n+1}$, $Wv_{n+1}$, and $Wd_{n+1}$ having a half resolution in the x and y directions. The above-mentioned transform corresponds to a multi-resolution transform of one level.

In this invention, a low-frequency component of the level (n+1) means the above-mentioned $S_{n+1}$, and high-frequency components of the level (n+1) mean the 3 components of $Wh_{n+1}$, $Wv_{n+1}$, and $Wd_{n+1}$. FIG. 2 is a drawing explaining the mode of an inverse transform of 1 level in the case where an inverse wavelet transform is used as an inverse multi-resolution transform. After the insertion of zero at every other point in the y direction by an up-sampling means 2⇑, the input signal $S_{n+1}$ is smoothed by a low pass filter LPF', and after the insertion of zero at every other point in the y direction by an up-sampling means 2⇑, the input signal $Wh_{n+1}$ is processed by a high pass filter HPF', and by the addition of the two results, $SX_{n+1}$ is obtained. By the application of the same processing to the input signals $Wv_{n+1}$ and $Wd_{n+1}$ too, $WX_{n+1}$ is obtained. Further, by the application of the same processing to the above-mentioned $SX_{n+1}$ and $WX_{n+1}$, $S_n$ having a twice resolution in the x and y directions is outputted.

In the case where the filters LPF and HPF to be used in the above-mentioned wavelet transform in FIG. 1 are the same as the filters LPF' and HPF' to be used in the above-mentioned inverse wavelet transform in FIG. 2, the transform is called an orthogonal wavelet transform, and in the case where the filters used in both transform processes are different, the transform is called a biorthogonal wavelet transform. In this invention, a biorthogonal wavelet transform in which the coefficients of these filters are laterally symmetrical with respect to the center line is more desirable. To state it in more detail, a biorthogonal wavelet transform in which the length of each filter coefficient is from 3 to 13 is used particularly desirably. An actual example of desirable coefficients are shown below.

EXAMPLE 1

Cohen, Daubechies, Feauveau 9-7

TABLE 1

| for Multi-resolution transformation | | for Inverse multi-resolution transformation | |
|---|---|---|---|
| Coefficient of low pass filter | Coefficient of high pass filter | Coefficient of low pass filter | Coefficient of high pass filter |
| 0.037829 | | | −0.037829 |
| −0.023849 | −0.064539 | −0.064539 | −0.023849 |
| −0.110624 | 0.04069 | −0.04069 | 0.110624 |
| 0.377403 | 0.418092 | 0.418092 | 0.377403 |
| 0.852699 | −0.788485 | 0.788485 | −0.852699 |
| 0.377403 | 0.418092 | 0.418092 | 0.377403 |
| −0.110624 | 0.04069 | −0.04069 | 0.110624 |
| −0.023849 | −0.064539 | −0.064539 | −0.023849 |
| 0.037829 | | | −0.037829 |

EXAMPLE 2

Cohen, Daubechies, Feauveau 5-3

TABLE 2

| for Multi-resolution transformation | | for Inverse multi-resolution transformation | |
|---|---|---|---|
| Coefficient of low pass filter | Coefficient of high pass filter | Coefficient of low pass filter | Coefficient of high pass filter |
| −0.176777 | | | 0.176777 |
| 0.353553 | 0.353553 | 0.353553 | 0.353553 |
| 1.06066 | −0.707107 | 0.707107 | −1.06066 |
| 0.353553 | 0.353553 | 0.353553 | 0.353553 |
| −0.176777 | | | 0.176777 |

EXAMPLE 3

Spline 4-12

TABLE 3

| for Multi-resolution transformation | | for Inverse multi-resolution transformation | |
|---|---|---|---|
| Coefficient of low pass filter | Coefficient of high pass filter | Coefficient of low pass filter | Coefficient of high pass filter |
| −0.013811 | | | 0.013811 |
| 0.041432 | | | 0.041432 |
| 0.052481 | | | −0.052481 |
| −0.267927 | | | −0.267927 |
| −0.071816 | 0.176777 | 0.176777 | 0.071816 |
| 0.966748 | −0.53033 | 0.53033 | 0.966748 |
| 0.966748 | 0.53033 | 0.53033 | −0.966748 |
| −0.071816 | −0.176777 | 0.176777 | −0.071816 |
| −0.267927 | | | 0.267927 |
| 0.052481 | | | 0.052481 |
| 0.041432 | | | −0.041432 |
| −0.013811 | | | −0.013811 |

FIG. 3 is a drawing showing the concept of a multi-resolution transform and an inverse multi-resolution transform in multiple levels. An input signal $S_0$ is decomposed into high-frequency components of N levels and a low-frequency component of the level N by transform operations of N times. After an image processing to be described later is applied to every component produced, by the inverse transform operations of N times to every component, a processed signal $S_0'$ is outputted. The number of times of practicing transform operations depends on the size, resolution, and the strength of the noise of the input signal $S_0$, and the operations of 2 to 20 times are desirable and to state it in particular, operations of 2 to 8 times are more desirable.

In the case where a one-dimensional filter bank method or a Laplacian pyramid method is employed for the multi-resolution method of this invention, the same calculation procedure can be applied except that a difference is produced in the processing by the down-sampling means 2↓ or the up-sampling means 2↑ in the transform or in the inverse transform shown in FIG. 1 and FIG. 2 in which the processing is not limited to every other one, and the concept of the multi-resolution transform and the inverse multi-resolution transform shown in FIG. 3 can be commonly used. In the case where a transform based on a two-dimensional Laplacian pyramid is used for the multi-resolution transform of this invention, the same concept shown in FIG. 3 can be applied except that there is a difference in the number of the high-frequency component obtained by the transform of one time, which becomes 1 in this case.

In this invention, the term "after suppressing the high-frequency components of the level 1 of said color difference multi-resolution signals, applying an inverse multi-resolution transform to said color difference multi-resolution signals to make them processed color difference signals" means, for example, an operation such that, after a set of color input signals are transformed into a luminance signal Y, a color difference signal I, and a color difference signal Q of YIQ basis, a multi-resolution transform shown in FIG. 3 is applied to each of the color difference signals I and Q as the input signal $S_0$, a suppression signal processing is applied to the high-frequency components $Wh_1$, $Wv_1$, and $Wd_1$ abstracted by the first transform, and $S_0'$ which has been restructured by the use of the high-frequency components $Wh_1'$, $Wv_1'$, and $Wd_1'$ obtained after suppression in an inverse multi-resolution transform is made to be a processed color difference signal I' and a processed color difference signal Q'.

As regards the suppression signal processing to be applied to these color difference signals, there is a method to make the signal values equally zero, a method to multiply the signal values by a positive constant smaller than 1, or the like. Further, the judgement whether or not a suppression signal processing is to be applied to the high-frequency components $Wh_n$, $Wv_n$, and $Wd_n$ ($1 < n \leq N$) obtained by the multi-resolution transform operations on and after the second one depends on the resolution and the condition of the noise of the image signal representing an original image. In this invention, it is a desirable mode of practice to suppress only the high-frequency signals of the level 1 of the color difference multi-resolution signals or to suppress only the high-frequency signals of the level 1 and level 2 of the color difference multi-resolution signals. In this case, for the number of times N of the multi-resolution transform operations to be applied to the color difference signals, 1 or 2 is sufficient.

In this invention, the term "coring processing" means a transform processing to apply suppression to an input signal in accordance with its strength, and for a simplest example, a method to make a portion where the absolute value is smaller than a threshold to be zero can be cited. An example is shown in FIG. 4. In a hard coring processing, a portion of an input signal where its absolute values are not greater than a threshold is equally outputted as zero, and if an absolute value of an input signal is greater than the threshold, it is outputted with its value kept as it is (FIG. 4(*a*)). In a soft coring processing, a portion of an input signal where its absolute values are not greater than a threshold is equally outputted as zero, and if an absolute value of an input signal is greater than the threshold, it is outputted with its absolute value subtracted by the threshold (FIG. 4(*b*)). Also as regards a non-linear coring processing, it is the same in the point that a portion of an input signal where the absolute values are not greater than a threshold is equally made to be zero, but in the case where an absolute value of an input signal is greater than a threshold, the degree of suppression is varied with a function of the absolute value of the input signal (FIG. 4(*c*)). The detail of a non-linear coring processing will be explained in more detail later.

In this invention, the term "after applying a coring processing using a condition for each level different from other levels to the high-frequency signals of each level of said luminance multi-resolution signals, applying an inverse multi-resolution transform processing to said luminance multi-resolution signals to make them a processed luminance signal," means, for example, an operation after a set of color input signals are transformed into a luminance signal Y, a color difference signal I, and a color difference signal Q of YIQ basis, and a multi-resolution transform shown in FIG. 3 is applied to the luminance signal Y taken as the input signal $S_0$, applying the above-mentioned coring processing to the high-frequency components $Wh_n$, $Wv_n$, and $Wd_n$ ($1 \leq n \leq N$) obtained under a condition for each level different from other levels, and then restructuring $S_0'$ by the use of $Wh_n'$, $Wv_n'$, and $Wd_n'$ ($1 \leq n \leq N$) having already undergone the coring processing in an inverse multi-resolution transform to make it a processed luminance signal Y'. In addition, the number of times of the multi-resolution transform operations N to be applied to the luminance signal Y depends on the resolution and the condition of the noise of the set of image signals representing an original image, and normally it is desirable to make it not smaller than 2 and not greater than 6.

Further, the term "a coring processing using a condition for each level different from other levels" means to change the threshold of a soft coring processing or a hard coring processing or to vary the shape of the transform curve of a non-linear coring processing, in accordance with the level number n of the high-frequency components $Wh_n$, $Wv_n$, and $Wd_n$ ($1 < n \leq N$). In expressing the threshold for each level or the shape of the transform curve, there is a noteworthy item. As regards the determination of the coefficients of a low pass filter for use in a multi-resolution transform, two kinds of method, that is, a method in which the total value is normalized to be the square root of 2, and a method in which the total value is normalized to be 1 are generally employed by persons specialized in the art. In the case where the former method in which the normalization is made to the square root of 2, as the result of filter processing being carried out two times in the x direction and in the y direction for each transform of one level, the signal values are enlarged twice for each transform operation of one level. That is, the result of division operation such that a frequency component of the level n obtained by a multi-resolution transform using a filter normalized in such a way as to make the total value the square root of 2 is divided by $2^n$ becomes equivalent to the result of the level n by a multi-resolution transform using a filter normalized in such a way as to make the total value 1.

In this invention, the term "a coring processing using a condition for each level different from other levels" does not state the above-mentioned difference of signal strength for each level due to the normalization of the filter coefficients, but it states that the coring condition for each level is different from other levels in the comparison such that the result of the transform is made to become equivalent to the result of a multi-resolution transform using a filter normalized in such a way as to make the total value 1.

To state it in more detail, for the coring condition of the high frequency components of the level 1, it is desirable a condition such that the value of pixels of an amount of not less than 5% and not more than 50% to the signal pixels is substantially suppressed to zero. As regards the coring condition of the high-frequency components of the level 2, it is desirable a condition such that the proportion of the pixels whose value is substantially suppressed to zero is equal to or less than that in the case of level 1. As regards the coring condition of the high-frequency components of the level n (n>2), it is desirable a condition such that the proportion of the pixels whose value is substantially suppressed to zero is not greater than 20% and less than the proportion of the pixels whose value is substantially suppressed to zero in the level (n−1).

Further, for the three high-frequency components $Wh_n$, $Wv_n$, and $Wd_n$ belonging to the same level, it is appropriate to carry out a coring processing using the same condition; however, it is more desirable to carry out a coring processing under a condition such that for the $Wd_n$ which is of high-frequency in both directions of x and y, the proportion of the pixels whose value is substantially suppressed to zero is not less than 1.1 times and not more than 2.0 times of the proportion of the pixels whose value is substantially suppressed to zero in respect of the remaining high-frequency components $Wh_n$ and $Wv_n$.

An image processing method of the fourth of this invention is characterized by the obtaining of a processed image signal through the steps of transforming a set of color image signals representing an original image into a luminance signal and color difference signals, transforming said luminance signal and said color difference signals separately into multi-resolution signals of the level 1 to the level N to make them luminance multi-resolution signals and color difference multi-resolution signals, after suppressing the high-frequency components of the level 1 of said color difference multi-resolution signals, applying an inverse multi-resolution transform to said color difference multi-resolution signals to make them processed color difference signals, after applying a coring processing using a condition for each level different from other levels to the high-frequency signals of each level of said luminance multi-resolution signals, applying an inverse multi-resolution transform processing to said luminance multi-resolution signals to make them a processed luminance signal, applying a sharpness enhancement processing to said processed luminance signal to make it a luminance signal of enhanced sharpness, transforming said luminance signal of enhanced sharpness and said processed color difference signals into a set of processed image signals.

An image processing apparatus of the fifth of this invention is a processing apparatus for practicing an image processing method of the fourth of this invention, and is characterized by comprising means for transforming a set of color image signals representing an original image into a luminance signal and color difference signals, means for transforming said luminance signal and said color difference signals separately into multi-resolution signals of the level 1 to the level N to make them luminance multi-resolution signals and color difference multi-resolution signals, a transform means for applying an inverse multi-resolution transform to said color difference multi-resolution signals to transform them into processed color difference signals after suppressing the high-frequency signals of the level 1 of said color difference multi-resolution signals, means for applying coring processing using a condition for each level different from other levels to the high-frequency signals of each level of said luminance multi-resolution signals, a transform means for applying an inverse multi-resolution transform to the luminance multi-resolution signals having already undergone said coring processing to transform them into a processed luminance signal, a sharpness enhancing means for applying a sharpness enhancement processing to said processed luminance signal to make it a luminance signal of enhanced sharpness, and a transform means for transforming said luminance signal of enhanced sharpness and said processed color difference signals into a set of processed color image signals.

A program of the sixth of this invention is a program for making a computer practice an image processing method of the fourth of this invention, and is one to make a computer function as means for transforming a set of color image signals representing an original image into a luminance signal and color difference signals, means for transforming said luminance signal and said color difference signals separately into multi-resolution signals of the level 1 to the level N to make them luminance multi-resolution signals and color difference multi-resolution signals, a transform means for applying an inverse multi-resolution transform to said color difference multi-resolution signals to transform them into processed color difference signals after suppressing the high-frequency signals of the level 1 of said color difference multi-resolution signals, means for applying coring processing using a condition for each level different from other levels to the high-frequency signals of each level of said luminance multi-resolution signals, a transform means for applying an inverse multi-resolution transform to the luminance multi-resolution signals having already undergone said coring processing to transform them into a processed luminance signal, a sharpness enhancing means for applying a sharpness enhancement processing to said processed luminance signal to make it a luminance signal of enhanced sharpness, and a transform means for transforming said processed luminance signal and said processed color difference signals into a set of processed color image signals.

In this invention, the term "applying a sharpness enhancing processing to a processed luminance signal" means applying a method in which a high pass filter such as a Laplacian filter, a Sobel filter, or a Hueckel filter known to the public is applied to a processed signal restructured by an inverse multi-resolution transform to abstract its edge component and it is added to the signal, or applying a method of sharpness enhancing processing using an unsharp mask to a processed luminance signal.

The technology concerning such a sharpness enhancement processing is explained, for example, in "Learning Practical Image Processing by C Programming Language (in Japanese) (authored by S. Inoue et al, published by Ohm Co., Ltd.) in detail. Among these methods, a method using a two-dimensional filter with its filter coefficients arranged symmetrically with respect to the center is especially desirable. A more desirable method is such one that a low pass filter with its coefficient of the central cell made maximum and the coefficient of the surrounding cells decreased gradually in accordance with the below described Gaussian function is applied to a processed luminance signal which has been restructured by an inverse multi-resolution transform to abstract a low-frequency component, and a luminance signal of enhanced sharpness is obtained by adding a product of a high-frequency component which has been obtained from the difference between the original processed luminance signal, which has been restructured by an inverse multi-resolution transform, and said low-frequency component multiplied by a number larger than 1 to said low-frequency component. An example of practice of this processing is shown in FIG. 5.

A Gaussian function: $f(x)=\exp(-x^2/2\sigma^2)$, x: distance from the center, σ: standard deviation.

It is desirable that a low pass filter for use in the above-mentioned sharpness enhancement processing is a regular square-shaped filter with its one side composed of odd number of pixels of 3 to 9.

In this invention, it is desirable that a set of image signals representing an original image are digital image signals obtained by the scanning of a dye image formed on a silver halide film.

A silver halide film designates a color negative film or a color reversal film, and a dye image of a color negative film or a color reversal film is photoelectrically converted into a set of transmission light quantity signals by means of a film scanning apparatus known to the public with a light receiving element such as a line CCD sensor or an area CCD sensor. The set of transmission light quantity signals obtained are amplified by an amplifier, and are converted into a set of digital signals by an A/D conversion device. Subsequently, corrections for removing noises proper to a light receiving element such as a dark fixed pattern noise correction and a shading correction are practiced, and further, a calibration processing for correcting the individual difference of the apparatus caused by the dispersion of the characteristics of a light receiving sensor, a color separation filter, a light source lamp, a lens, and other optical parts is carried out. Subsequently, the corrected set of transmission light quantity signals are transformed into a set of density signals by a logarithmic transform or the like. This set of density signals are sent to a processing condition judgement section, where processing conditions for practicing image processing is calculated, and on the basis of these processing conditions, the above-mentioned set of density signals are transformed into a set of color image signals which have already undergone a color balance correction processing, a gradation adjustment processing, a negative-to-positive reversing processing.

It is desirable to use the set of color image signals which have already undergone a color balance correction processing, a gradation adjustment processing, a negative-to-positive reversing processing as a set of image color image signals representing an original image of this invention. Further, it may be appropriate to practice the process for obtaining a set of color image signals representing an original image and the process of the image processing of this invention in one and the same apparatus having the both functions, or also it is appropriate to practice the former process and the latter process in different apparatus respectively. In the case where either of the above-mentioned processes are practiced in different apparatus, a set of color image signals representing an original image are transmitted to apparatus for practicing this invention through a communication line or a medium such as a CD-ROM. It is appropriate that the mode of the transmission data in this case is made to follow a format of an image file known to the public, and it is desirable that the format is a compression or reversible compression format and the number of quantization bits is larger than the number of quantization bits of an image file to be outputted by an apparatus for practicing this invention.

In an image processing method of the first and fourth of this invention, it is desirable that the aforesaid means for applying a coring processing to the luminance multi-resolution signals includes at least one processing to be practiced under a non-linear coring condition such that the rate of change for the signal values of higher rank corresponding to at least 5% to the total number of signal values with respect to the absolute value of an input signal becomes smaller than 10%, and the signal values of lower rank corresponding to at least 15% to the total number become substantially zero.

Further, in an image processing apparatus of the second and fifth of this invention, it is desirable that the aforesaid means for applying a coring processing to the luminance multi-resolution signals includes at least one means for practicing a processing under a non-linear coring condition such that the ratio of change for the signal values of higher rank corresponding to at least 5% to the total number of signal values with respect to the absolute value of an input signal becomes smaller than 10%, and the signal values of lower rank corresponding to at least 15% to the total number become substantially zero.

Further, in a program of the third and sixth of this invention, it is desirable that the aforesaid means for applying a coring processing to the luminance multi-resolution signals includes at least one means for practicing a processing under a non-linear coring condition such that the ratio of change for the signal values of higher rank corresponding to at least 5% to the total number of signal values with respect to the absolute value of an input signal becomes smaller than 10%, and the signal values of lower rank corresponding to at least 15% to the total number become substantially zero.

In the above-mentioned description, the term "an input signal" means an input signal to which a coring processing is to be applied, and to state it concretely, it corresponds to the high-frequency components $Wh_n$, $Wn_n$, and $Wd_n$ ($1 \leq n \leq N$) in the above-mentioned explanation. The term "the signal values of higher-rank corresponding to at least 5% to the total number of signal values with respect to the absolute value of an input signal" means the signal values of higher rank falling within a range of at least 5% to the total number of signal values when the total signal values of one component arranged in the order of their absolute values from the largest to the smaller, and for example, when the coring condition of the $Wh_3$ is discussed, the comparison is made between the signal values belonging to the $Wh_3$ only (In this case, $Wh_2$ or $Wv_3$ does not become the object of the comparison, for example.). Further, the term "the signal values become substantially zero" means that the signal values after a coring processing become smaller than the value of the signal corresponding to a position of 4% to the total number of signal values from the smallest in the case where the signal values of an input signal are compared as arranged in the order of the absolute value from the largest to the smaller. It is desirable that the coring condition specified here is applied to the coring of the level 1 and/or the level 2.

In this invention, it is desirable to change the condition of the coring processing of the luminance multi-resolution signals of the level n with reference to a high-frequency signal of a higher level than n.

The content of the above-mentioned will be explained in more detail. As regards a high-frequency component obtained by a multi-resolution transform, the higher the number of the level n becomes, the presence of the high-frequency component of lower resolution, that is, the wider-range edge component it expresses. Further, the higher the number of level becomes, the more the number of pixels decreases in proportion to the resolution. For example, in the case where a wavelet transform is used for the multi-resolution transform, the number of pixels of one side of a component of the level 1 is ½ of the number of pixels of one side of an image signal representing an original image, and the number of pixels of one side of a component of the level 2 is ½ of the number of pixels of one side of a component of the level 1. Hence, the information at the coordinates (x, y) of a high-frequency component of the level n corresponds to that at the coordinates $(x/2^i, y/2^i)$ of a high-frequency component of the level (n+i). Also in the case where a filter bank method or a Laplacian pyramid method is used for the multi-resolution transform, a relationship corresponding to the above-mentioned is effective on the basis of the down-sampling condition.

The term "to change the condition of the coring processing of the luminance multi-resolution signals of the level n with reference to a high-frequency signal of a level higher than n" means that, in applying a coring processing to the signal value at the coordinates (x, y) of the high-frequency component $Wd_n$ of the level n for example, the threshold or the transform curve is selected in accordance with the signal value at the coordinates $(x/2^i, y/2^i)$ of the corresponding high-frequency component $Wd_{n+i}$ of the level (n+i). In the above, in the case where the signal value at the coordinates $(x/2^1, y/2^i)$ of the high-frequency component $Wd_{n+i}$ of the higher level is large, it is high the possibility that the coordinates (x, y) of the object of coring $Wd_n$ correspond to an edge area with a wide view of it taken, and because it is desirable not to suppress the signal value of a high-frequency component at coordinates corresponding to an edge area of a photographic object, the condition of coring is eased. On the contrary, in the case where the signal value at the coordinates $(x/2^i, y/2^i)$ of the high-frequency component $Wd_{n+i}$ of the higher level is small, it is high the possibility that the coordinates (x, y) of the object of coring $Wd_n$ corresponds to a flat area with a wide view of it taken, and because a granular noise in a flat area is noticeable, the condition of coring is strengthened. For the high-frequency signal of a high level to be referred to for the purpose of the above-mentioned judgement, it is desirable to use a high-frequency signal of a level higher than that of the high-frequency signal of the object of coring by 1 to 3 levels. That is, in the above-mentioned example, it is desirable to make i satisfy the inequality $1 \leq i \leq 3$. It is possible that the number of levels to be referred to is 1, but also it is appropriate to practice a judgement with reference to a plurality of levels and on the basis of a weighted average of the plural values referred to.

Further, in this invention, it is desirable that the condition of the coring processing of a luminance multi-resolution signal of the level n is such one as to preserve the low-frequency signal of each level generated in a multi-resolution transform and to be changed with reference to the low-frequency signal of the level n.

The above-mentioned will be explained in more detail. Generally speaking, the range of the luminance distribution of an object scene in a photographic image extends over a range of $10^3$ or $10^4$ in an arbitrary unit, but the luminance range which can be displayed by a display device or a print is only an order of $10^2$. Therefore, because the wide luminance distribution of a scene of a photographic object is compressed to a luminance range which can be displayed in producing an image signal, an operation to compress the gradation in the both sides of high luminance and low luminance is practiced in most cases. For the image signal representing an original image in this invention, there is the possibility that an image signal after the application of the above-mentioned compression processing is used. In this case, because the gradation in the both sides of high luminance and low luminance is compressed, if high-frequency components in these regions are too much suppressed, a risk to destroy the depiction of the fine structures of a photographic object is raised. On the other hand, because the gradation in the medium luminance region is not compressed, if the suppression of the high-frequency components is insufficient, a granular noise becomes noticeable.

Further, in the case where an image signal representing an original image is obtained by the scanning of a silver halide film, caused by the characteristic of a silver halide film such that the granular noise becomes stronger in the darker areas, graininess in the shadow area becomes noticeable. However, in such a strong granularity processing condition as to dissolve the granularity in a shadow area completely, the fine structure in the highlight area is lost, which makes the image give an impression of blur. In view of these situations, this invention provides a technology to make it possible to dynamically adjust the condition of removing a granular noise in accordance with the luminance level of an image.

Generally speaking, in the inverse multi-resolution transform of a signal which has undergone multi-resolution transforms up to the level N, if the low-frequency component of the level N and the high-frequency components of the levels 1 to N are given, the original signal can be restructured. In short, the low-frequency components of the levels 1 to (N−1) are unnecessary. Therefore, in the calculation of a usual multi-resolution transform, the low-frequency components of the levels 1 to (N−1) are abandoned in most cases from the viewpoint of the saving of the storage capacity.

In this invention, the term "to preserve the low-frequency signal of each level generated in a multi-resolution transform" means to preserve the low-frequency components of the levels 1 to (N−1) calculated in the process of calculation in a form to be used for the reference to be described later without abandoning them.

Further, the term "the condition of the coring processing of a luminance multi-resolution signal of the level n is changed with reference to the low-frequency signal of the level n" means, for example, in applying a coring processing to the signal value at the coordinates (x, y) of the high-frequency component $Wd_n$ of the level n, the threshold value or the transform curve is selected in accordance with the signal value at the coordinates (x, y) of the preserved low-frequency component $S_n$. By this means, it becomes possible to dynamically adjust the condition of removing a granular noise in accordance with the luminance level of an image.

Further, in this invention, it is desirable that the condition of the coring processing of a luminance multi-resolution signal of the level n is such one as to preserve the low-frequency signal of each level generated in the multi-resolution transform, and to be changed with reference to a low-frequency signal of a level higher than n.

The above-mentioned will be explained in more detail. In the case where a fine density variation exhibited in a specified range of neighborhood as viewed widely is recognized as one not expressing the structure of a photographic object, the fine density variation is recognized as a granular noise. That is, a granular noise is one not to be generated by the signal value of one pixel, but one to be generated by the relationship between the signal values of the neighboring pixels. Hence, in the case where the condition of removing a granular noise is adjusted in accordance with the luminance level of an image, as regards the luminance level of an image for use in a condition adjustment, it is desirable to make the judgement by not only the luminance value of the pixel of the object of noise removal but also the widely-viewed luminance value with the luminance value of the neighboring pixels taken into account.

It will be explained a case taken for instance where it is used as a multi-resolution transform, a transform in which the number of pixels in the x direction and y direction is made ½ for each one-level transform in the same way as a wavelet transform. In order to determine the coring processing condition of the signal value at the coordinates (x, y) of the high-frequency component of the level n $Wd_n$, if the signal value at the coordinates $(x/2^i, y/2^i)$ of the low-frequency component of the level (n+i) $S_{n+i}$ is referred to, the reference signal value indicates the average luminance value over $(2^i \times 2^i)$ pixels in the neighborhood of the coordinates (x, y) of the high-frequency component of the level n $Wd_n$ which is the object of the coring processing. Hence, it is possible to determine a coring processing condition on the basis of a widely-viewed luminance value having the luminance value of the neighboring pixels taken into account by this invention.

For the low-frequency signal of a level higher than n to be referred to for the purpose of the above-mentioned judgement, it is desirable to use a low-frequency signal of a level higher than that of the high-frequency signal by 1 to 3 levels. That is, in the above-mentioned example, it is desirable to make i satisfy the inequality $1 \leq i \leq 3$. The number of levels to be referred to may be one, but also it is appropriate to practice the judgement with reference to signals of a plurality of levels and on the basis of the weighted average of the signal values for example.

In an image processing method of the first and fourth of this invention, it is desirable that the low-frequency signals of each level generated in a multi-resolution transform of a luminance signal and color difference signals are preserved, the condition of a photographic object is judged with reference to one or more of said luminance low-frequency signals, color difference low-frequency signals preserved, and a luminance high-frequency signal, and the condition of a coring processing is changed on the basis of the result of the judgement.

Further, it is desirable that an image processing apparatus of the second and fifth of this invention further comprises means for preserving the low-frequency signals of each level generated in a multi-resolution transform of a luminance signal and color difference signals, means for judging the condition of a photographic object with reference to one or more of said luminance low-frequency signals, color difference low-frequency signals preserved, and a luminance high-frequency signal, and means for changing the condition of a coring processing on the basis of the result of the judgement.

Further, it is desirable that a program of the third and sixth of this invention makes a computer function further as means for preserving the low-frequency signals of each level generated in a multi-resolution transform of a luminance signal and color difference signals, means for judging the condition of a photographic object with reference to one or more of said luminance low-frequency signals, color difference low-frequency signals preserved, and a luminance high-frequency signal, and means for varying the condition of a coring processing on the basis of the result of the judgement.

The above-mentioned will be explained in more detail. It is well known that granular noises are especially noticeable in a particular photographic object such as the human face, skin, or the blue sky. It will be explained a case taken for example where a set of color image signals representing an original image are transformed into a luminance signal Y and color difference signals I and Q of YIQ basis, and each of them undergoes a multi-resolution transform based on a wavelet transform. As described in the above, in determining the coring processing condition of the signal value at the coordinates (x, y) of the high-frequency component of the level n $Wd_n$ of the luminance signal Y, if the signal value at the coordinates $(x/2^i, y/2^i)$ of the low-frequency component of the level (n+i) $S_{n+i}$ of the luminance signal Y is referred to, the reference signal value indicates the average luminance value over the $(2^i \times 2^i)$ pixels in the neighborhood of the coordinates (x, y) of the high-frequency component of the level n $Wd_n$ which is the object of the coring processing.

Further, by referring to the signal value at the coordinates $(x/2^i, y/2^i)$ of the low-frequency component of the level (n+i) $S_{n+i}$ of the color difference signal I and the signal value at the coordinates $(x/2^i, y/2^i)$ of the low-frequency component of the level (n+i) $S_{n+i}$ of the color difference signal Q, it is possible to know what kind of color as viewed widely has the area of the $(2^i \times 2^i)$ pixels in the neighborhood of the coordinates of the high-frequency component of the level n $Wd_n$ which is the object of the coring processing. In the case where this color is included in a particular region such as the color of the human skin, or the color of the sky, there is the possibility that this region of color represents the particular photographic object such as the human face or skin, or the blue sky.

Further, by referring to the signal value at the coordinates $(x/2^i, y/2^i)$ of the high-frequency component of the level (n+i) $Wh_{n+i}$, $Wv_{n+i}$, and $Wd_{n+i}$ of the luminance signal Y, it is possible to obtain the information on to what degree a complex structure as viewed widely has the area of the $(2^i \times 2^i)$ pixels in the neighborhood of the coordinates (x, y) of the high-frequency component of the level n $Wd_n$ which is the object of the coring processing.

By referring to this degree of complexity, it is possible to discriminate the photographic objects having a similar hue such as a wall painted in beige, the skin of a person, a piece of beige-colored cloth. In the case where a photographic object is judged to be a particular one such as the face or the skin of a person, or the blue sky by the synthetic judgement of the above-mentioned, by switching over the coring condition of the signal value at the coordinates (x, y) of the high-frequency component of the level n $Wd_n$ which is the object of the coring processing to a coring condition determined for the particular photographic object, it becomes possible to apply precisely the processing in the desired condition to a particular photographic object such as the face, or the skin of a person, or the blue sky only. For the signal of a level higher than n to be referred to for the purpose of the above-mentioned judgement, it is desirable to use a low-frequency signal of a level higher than that of the high-frequency signal which is the object of the coring processing by 1 to 5 levels. That is, it is desirable to make i satisfy the inequality $1 \leq i \leq 5$. The number of the levels to be referred to may be one, but it is more desirable to practice the judgement with reference to the value of signals of a plurality of levels and on the basis of the weighted average of the signal values.

In an image processing method of the first and fourth of this invention, it is desirable to apply a gradation transform to the luminance low-frequency image signal of the highest level before the application of an inverse multi-resolution transform.

Further, an image processing apparatus of the second and fifth of this invention further comprises means for applying a gradation transform to the luminance low-frequency image signal of the highest level before the application of an inverse multi-resolution transform.

Further, it is desirable that a program of the third and sixth of this invention makes a computer function as means for applying a gradation transform to the luminance low-frequency image signal of the highest level before the application of an inverse multi-resolution transform.

The above-mentioned will be explained in more detail. Generally speaking, the range of the luminance distribution of an object scene in a photographic image extends over a wide range of $10^3$ or $10^4$ in an arbitrary unit, but the luminance range which can be displayed by a display device or a print is only an order of $10^2$. Therefore, because the wide luminance distribution of a scene of a photographic object is compressed to a luminance range which can be displayed in producing an image signal, an operation to compress the gradation in the both sides of high luminance and low luminance is practiced in most cases.

In a suitable mode of practice of this invention, for the image signal representing an original image in this invention, it is supposed to use a signal after the above-mentioned compression processing is once applied to it; however, sometimes it is generated a requirement such that a fine adjustment of the gradation should be carried out at the same time while finishing operations of an image such as the suppression of a granular noise and the enhancement of sharpness are being carried out. In this case, if it is tried to do all of the compression processing of gradation and the calculations relating to this invention over again, the calculation takes a considerable time which lowers the productivity remarkably. However, if the fine adjustment of gradation is made for the luminance low-frequency component of the highest level N $S_N$ generated by a multi-resolution transform of a luminance signal of this invention, the same effect can be obtained by the re-calculation of an inverse multi-resolution transform of the luminance signal only.

In an image processing method of the first and fourth of this invention, it is desirable to apply a gray-balance adjustment to the color difference low-frequency image signals of the highest level before the application of an inverse multi-resolution transform.

Further, it is desirable that an image processing apparatus of the second and fifth of this invention further comprises means for applying a gray-balance adjustment to the color difference low-frequency image signals of the highest level before the application of an inverse multi-resolution transform.

Further, it is desirable that a program of the third and sixth of this invention makes a computer function further as means for applying a gray-balance adjustment to the color difference low-frequency image signal of the highest level before the application of an inverse multi-resolution transform.

The above-mentioned will be explained in more detail. Because the density of a usual color negative film is adjusted by the amount of exposure at the time of printing, it is designed in such a way that the B, G, and R densities to be produced by a gray light exposure have a certain difference between them. Further, as regards not only a color negative film but also a reversal film or an image photographed by a digital still camera or the like, the balance among the B, G, R signals varies due to the difference in the color temperature between the photographing light sources such as the day-light and a fluorescent light and the difference in the spectral sensitivity between the photographing device and the human eye. For this reason, it is necessary to carry out a gray balance adjustment in order that a feeling of the balance of the R, G, and B signal intensities being proper may be obtained when the image is observed.

In a suitable mode of practice of this invention, for the image signal representing an original image in this invention, it is assumed to use a signal after the above-mentioned gray balance adjustment has been once applied to it; however, in actual operations, sometimes it is generated a requirement that the fine adjustment of a gray balance should be carried out at the same time while finishing operations of an image such as the suppression of a granular noise and the enhancement of sharpness are being carried out. In this case, if it is tried to do all of the gray balance adjustment operation and the calculations relating to this invention over again, the calculation takes a considerable time which lowers the productivity remarkably. However, if the fine adjustment of a gray balance is carried out for the color difference low-frequency components of the highest level N $S_N$'s generated by a multi-resolution transform of color difference signals of this invention, the same effect can be obtained by the re-calculation of an inverse multi-resolution transform of the color difference signals only. In this way, this invention provides a high-speed means for adjusting a gray balance.

BRIEF DESCRIPTION OF THE DRAWINGS

FIG. 6 is a system block diagram of a photographic film image reading apparatus with an image processing apparatus of this invention built in;

BEST MODE FOR CARRYING OUT THE INVENTION

In the following, with reference to the drawings, concrete examples of the embodiment of an image processing method and an image processing apparatus will be explained.

Figure 1:
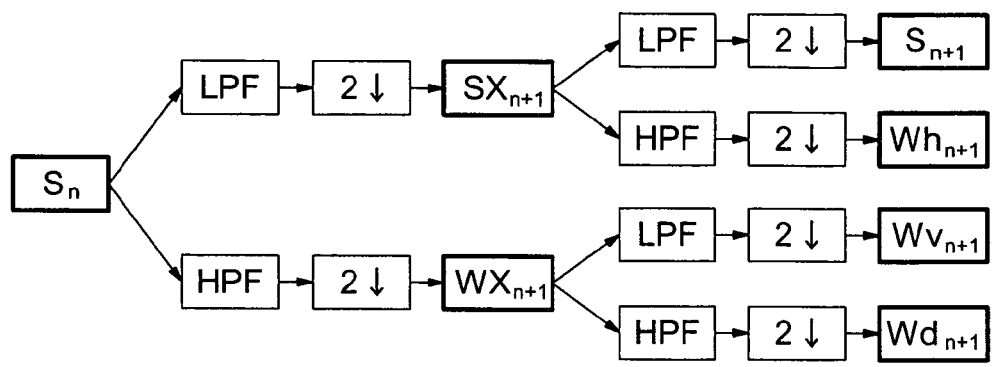
FIG. 1 is a drawing for explaining a mode of transform of one level in the case where a wavelet transform is used as a multi-resolution transform.
Figure 2:
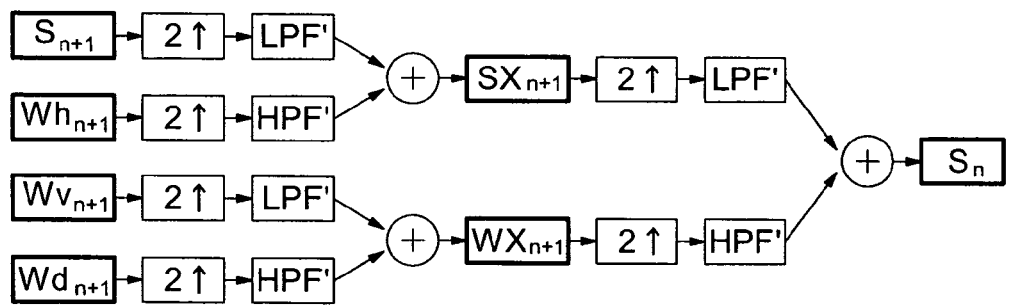
FIG. 2 is a drawing for explaining a mode of inverse transform of one level in the case where a wavelet inverse transform is used as an inverse multi-resolution transform.
Figure 3:
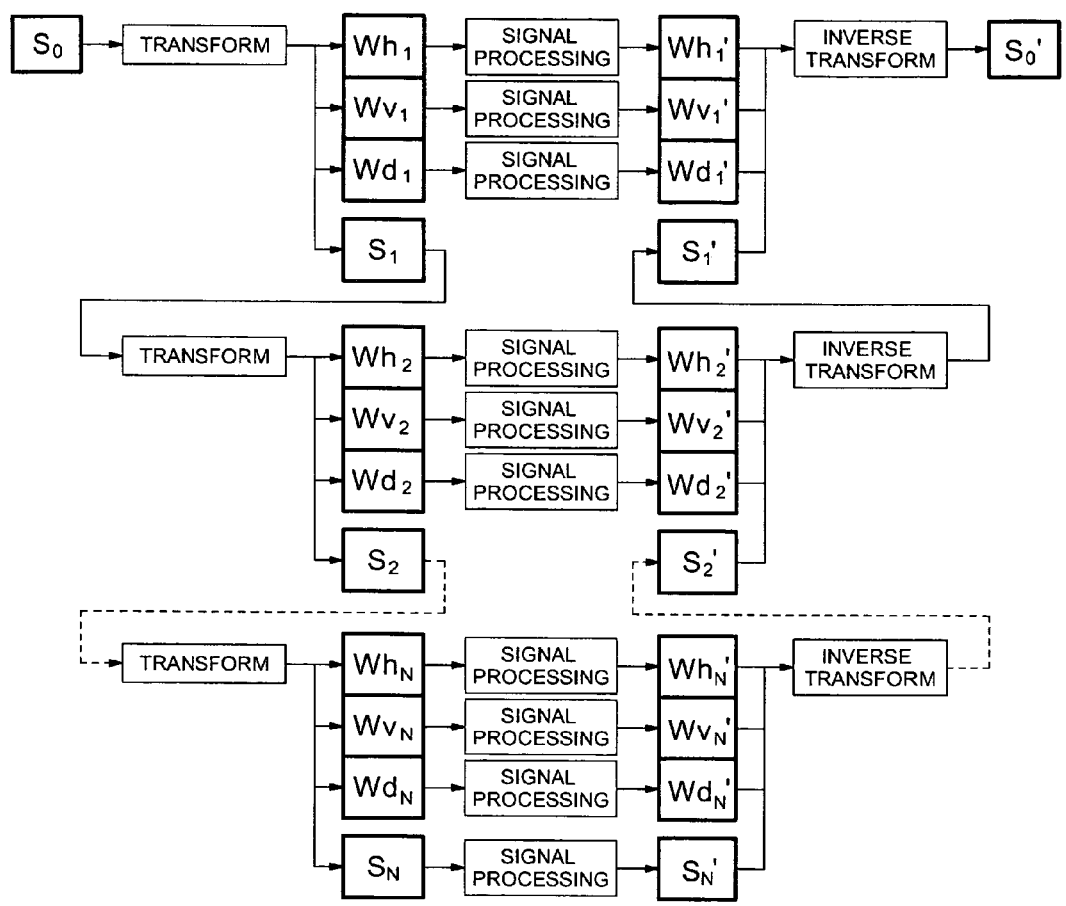
FIG. 3 is a drawing showing the concept of a multi-resolution transform and an inverse multi-resolution transform at multiple levels.
Figure 4:
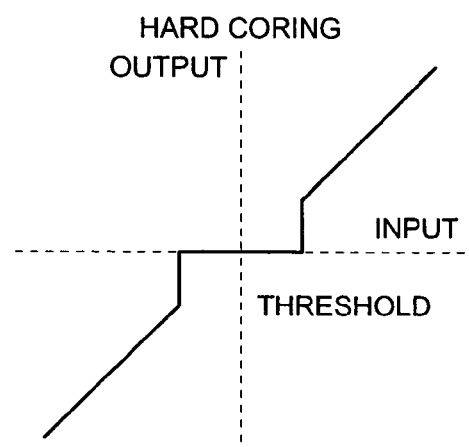
FIG. 4(a) to FIG. 4(c) are drawings each showing an example of a coring processing.
Figure 4:
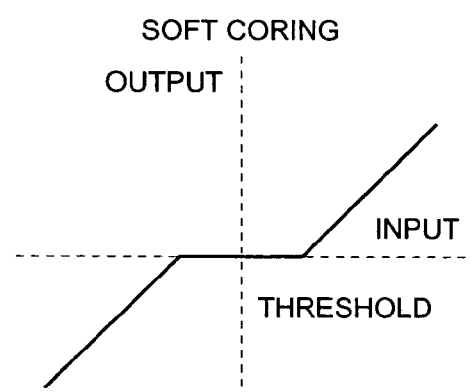
Figure 4:
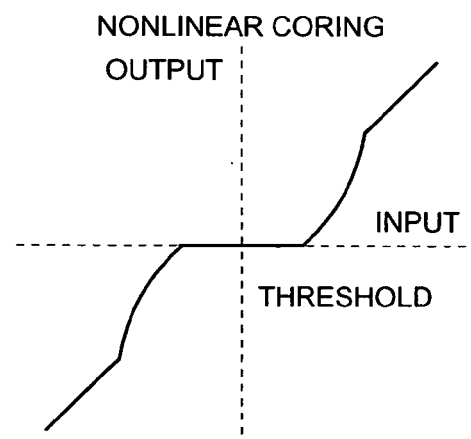
Figure 5:
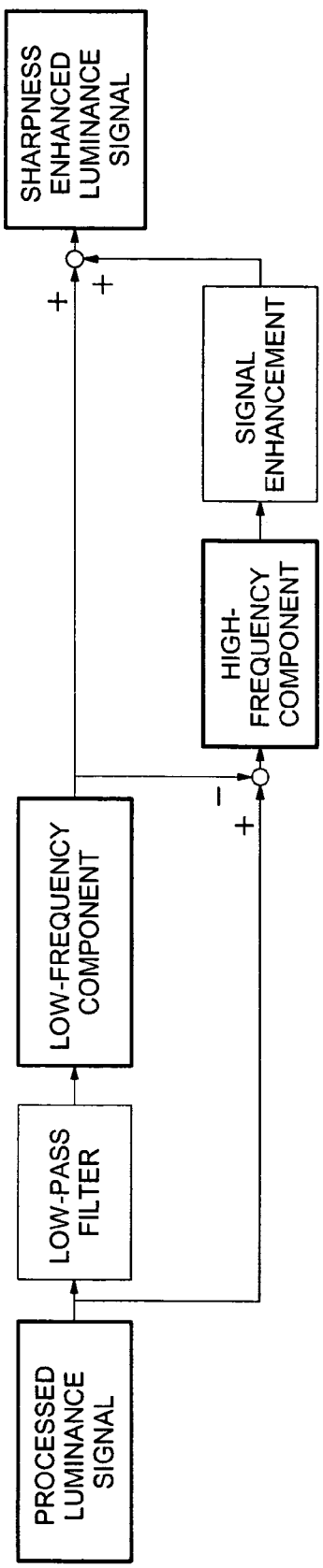
FIG. 5 is a drawing showing a flow of a processing for obtaining a luminance signal of enhanced sharpness.
Figure 6:
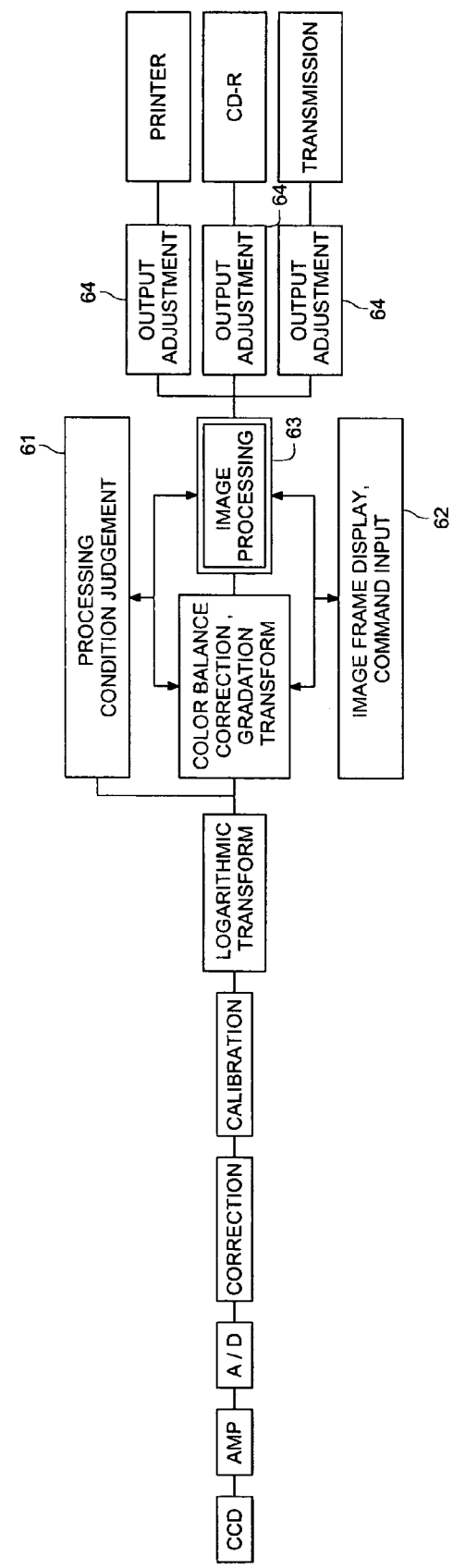

FIG. 6 is a system block diagram of a photographic film image reading apparatus with an image processing apparatus of this invention built in. An image on a color negative film or a color reversal film is photoelectrically converted into a set of transmission light quantity signals by means of a film scanning apparatus known to the public with a light receiving element such as a line CCD sensor or an area CCD sensor. The set of transmission light quantity signals obtained are amplified by an amplifier, and are converted into a set of digital signals by an A/D conversion device. Subsequently, corrections for removing noises proper to a light receiving element such as a dark fixed pattern noise correction and a shading correction are practiced, and further, a calibration processing for correcting the individual difference of the apparatus caused by the dispersion of the characteristics of a light receiving sensor, a color separation filter, a light source lamp, a lens, and other optical parts is carried out.

Subsequently, the set of transmission light quantity signals, having undergone the correction, are transformed into a set of density signals by logarithmic transform or the like. This set of density signals are sent to a processing condition judgement section 61, where processing conditions for practicing image processing are calculated, and on the basis of these processing conditions, the above-mentioned set of density signals are transformed into a set of color image signals which have already undergone a color balance correction processing, a gradation adjustment processing, a negative-to-positive reversing processing. The result of this is displayed on an image display device 62, and also it is possible to carry out a re-processing by changing the conditions of color balance correction, gradation correction, and negative-to-positive reversing.

The fixedly determined set of color image signals to which the application of a color balance correction, a gradation correction, and a negative-to-positive reversing has already been finished are sent to an image processing apparatus 63 of this invention, and transformed into a set of processed image signals on the basis of a condition instructed by the processing condition judgement section or an operator. Also it is possible that, in this stage, the image is again displayed on the image display device 62, and an operator changes the processing condition and orders re-processing if he judges it to be necessary. The processed set of image signals which have been fixedly determined are further sent to one of output adjustment sections 64 corresponding to the respective output apparatus, and after a transform of color space, a resolution adjustment, a reduction or enlargement processing, a compression processing, a data format transform, etc. are carried out, the set of color image signals are outputted to a printer, recorded in a media, or transmitted through a communication line.

Figure 7:
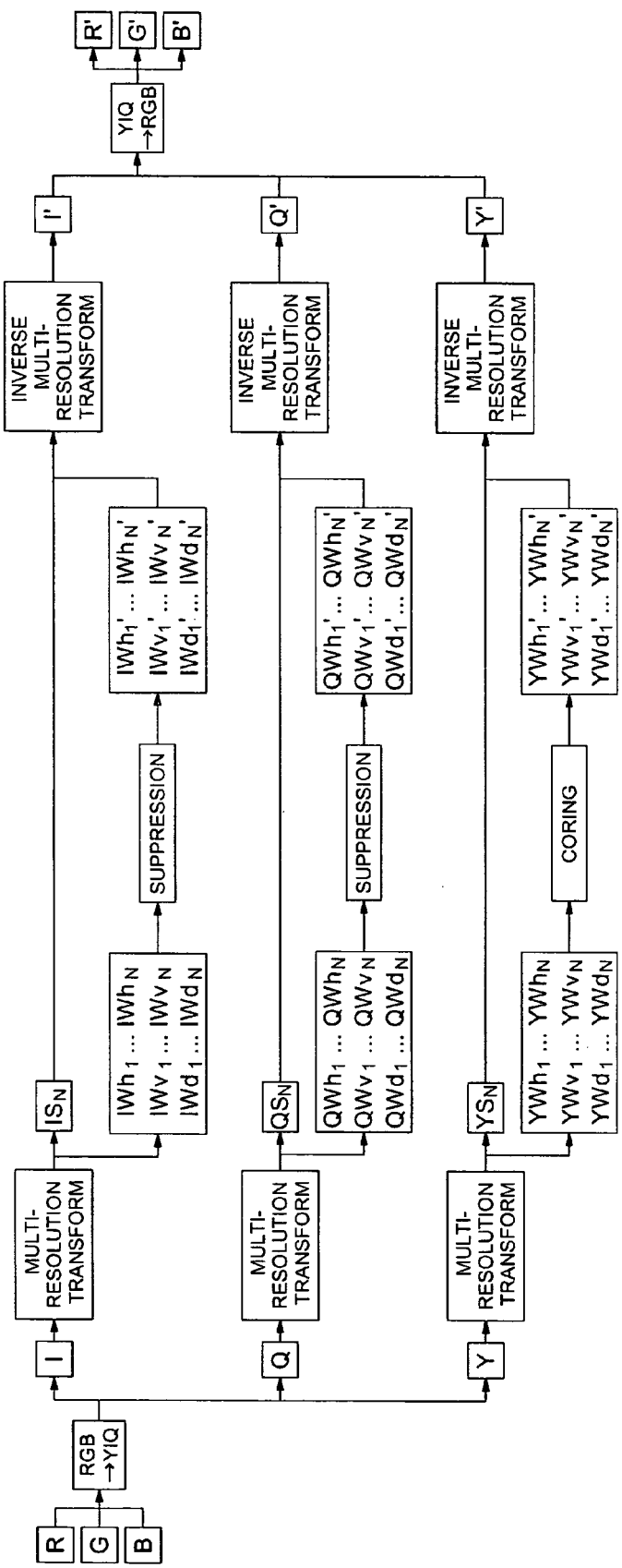
FIG. 7 is a system block diagram of a mode of practice of an internal processing of an image processing apparatus of this invention.

FIG. 7 is an example of a system block diagram of the internal processing of the image processing apparatus 63 shown in FIG. 6. An inputted set of R, G, and B signals are transformed into a set of Y, I, and Q signals. The I signal and the Q signal are separately subjected to a multi-resolution transform, and after their high-frequency components are suppressed, the multi-resolution signals are transformed into an I' signal and a Q' signal respectively by an inverse multi-resolution transform. The Y signal undergoes a multi-resolution transform, and after the high-frequency components are suppressed, the multi-resolution signals are converted into a Y' signal by an inverse multi-resolution transform. Finally, the set of the signals of I', Q' and Y' are transformed into a set of signals of RGB basis, to be outputted as a set of signals of R', G', and B' after the processing.

Figure 8:
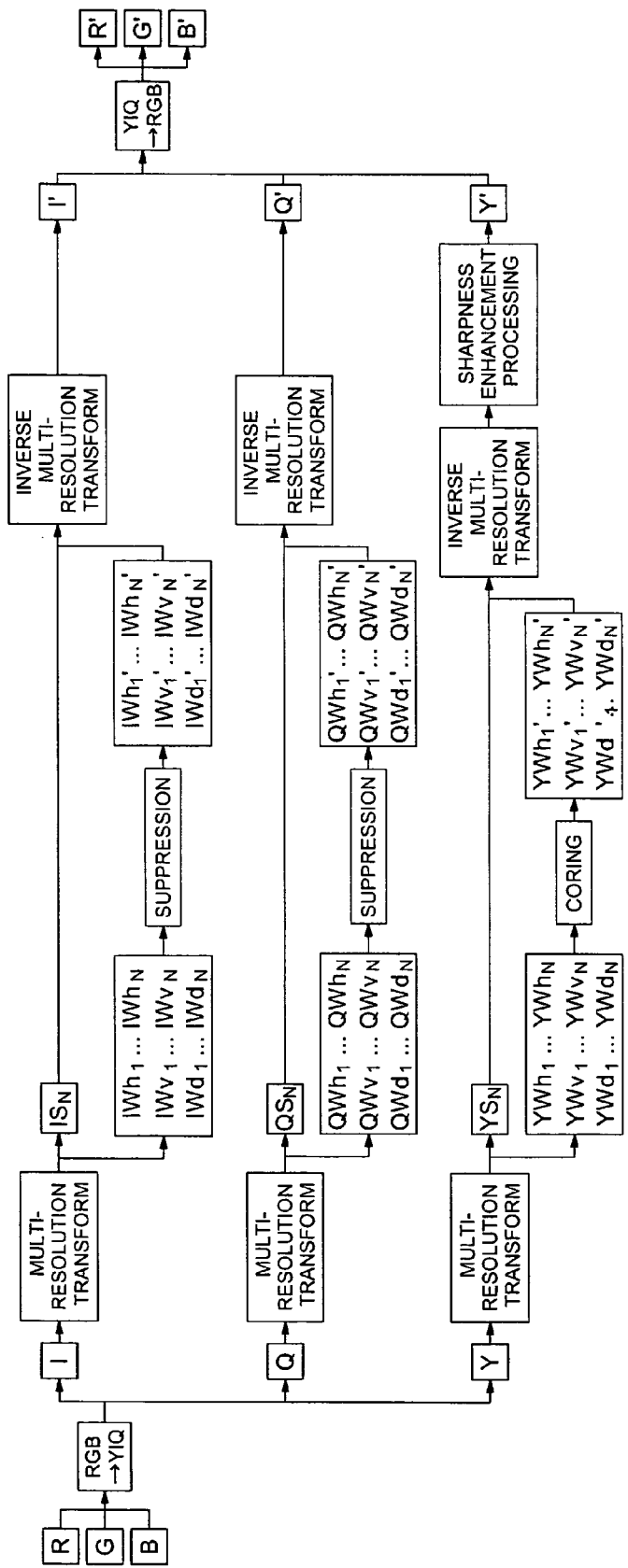
FIG. 8 is a system block diagram of another mode of practice of an internal processing of an image processing apparatus of this invention.

FIG. 8 is a system block diagram of another example of the internal processing of the image processing apparatus shown in FIG. 6. In this system, Y signal undergoes a multi-resolution transform, and after the high-frequency components are suppressed, the multi-resolution signals undergo an inverse multi-resolution transform, and by the further application of a sharpness enhancement processing, a Y' signal is obtained.

Figure 9:
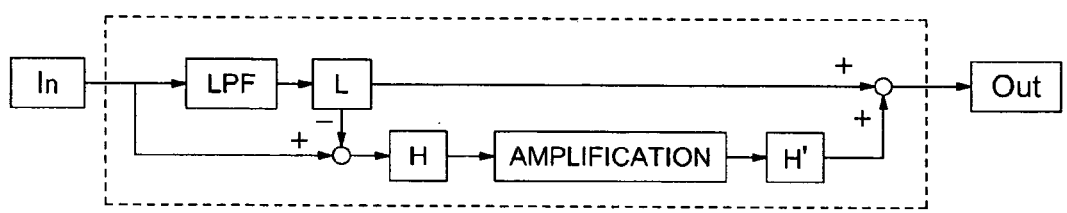
FIG. 9 is a drawing showing a mode of practice of a sharpness enhancement processing shown in FIG. 8.

FIG. 9 shows an example of a mode of practice of the above-mentioned sharpness enhancement processing. An inputted signal In passes a two-dimensional low pass filter LPF, and a low-frequency component L is abstracted. Next, by taking the difference between the input signal In and the low-frequency component L, a high-frequency component H is abstracted. This high-frequency component H is transformed into H' by an amplification processing, and by the addition of this amplified high-frequency component H' to the low-frequency component L, an output signal Out is generated.

Figure 10:
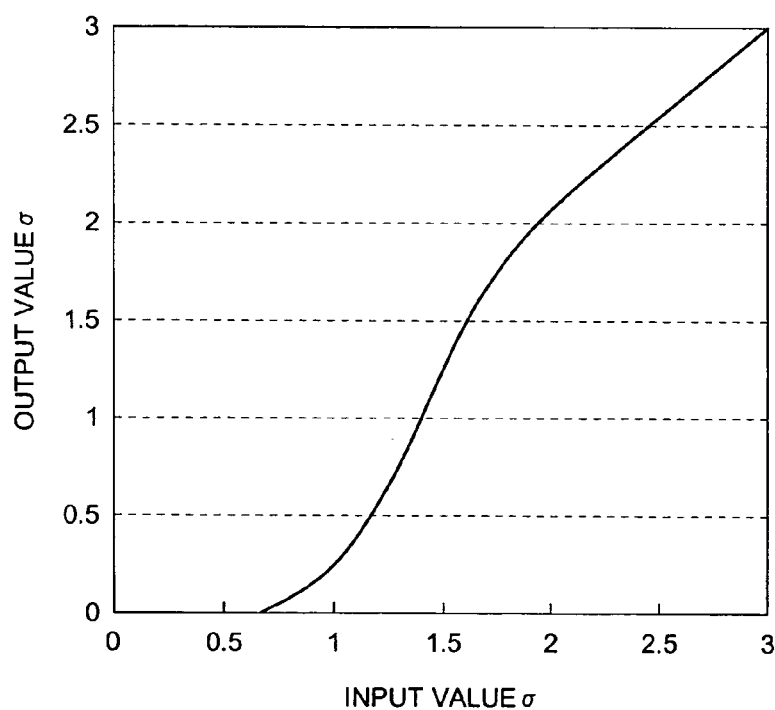
FIG. 10 is a drawing showing a condition of a coring processing.
Figure 11:
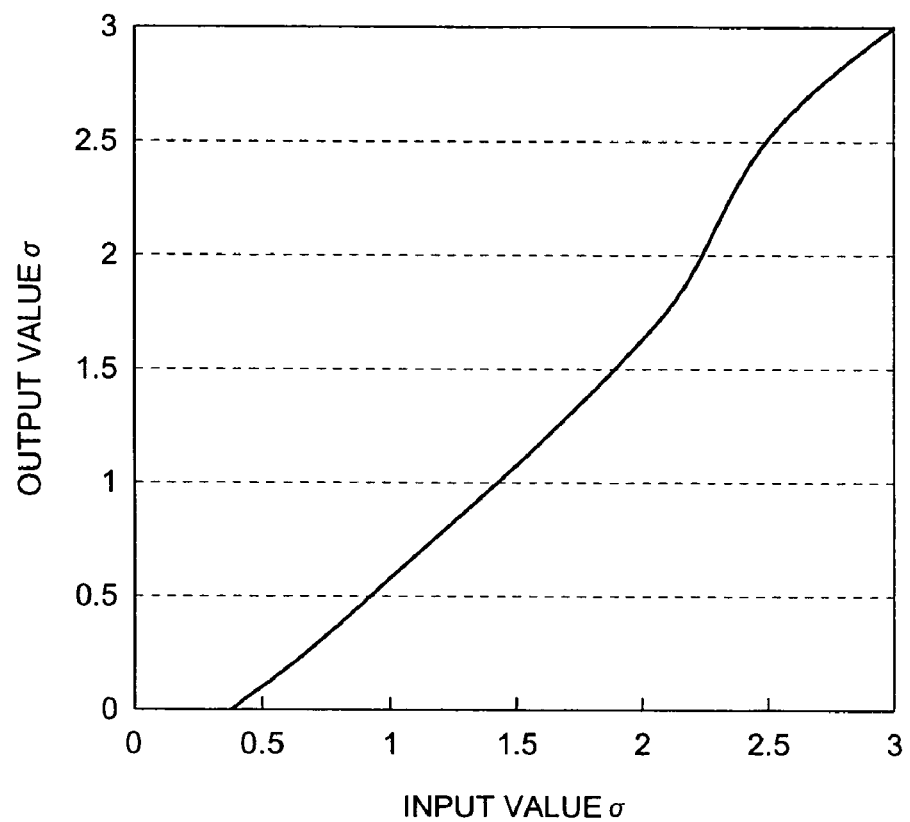
FIG. 11 is a drawing showing a condition of a coring processing.
Figure 12:
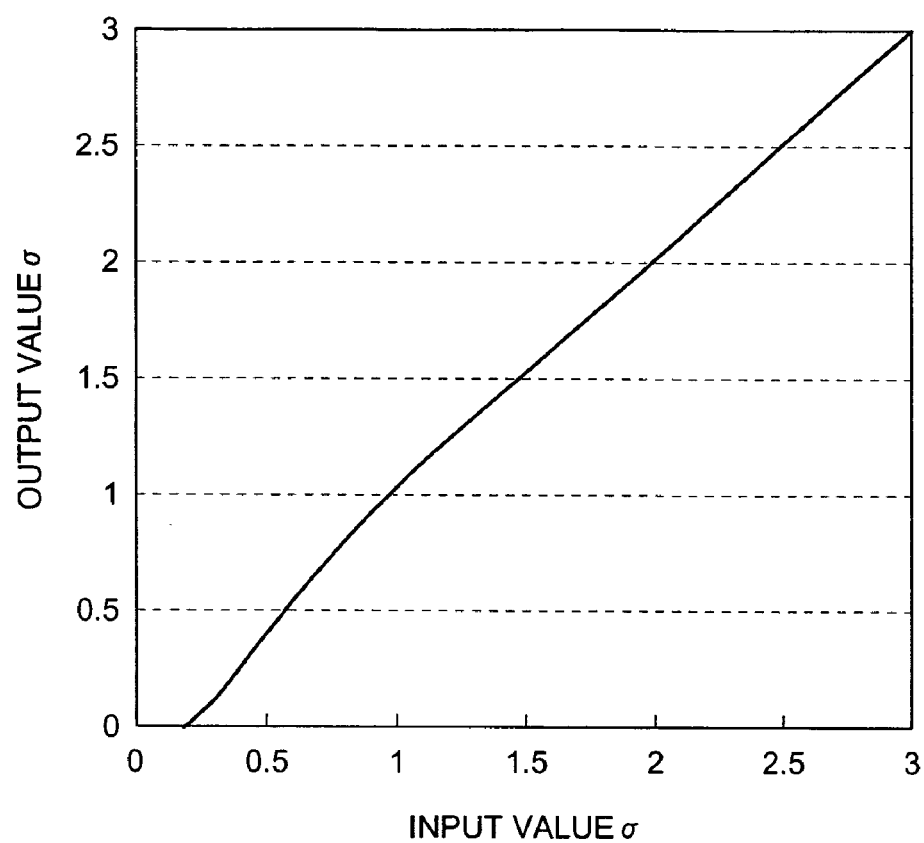
FIG. 12 is a drawing showing a condition of a coring processing.
Figure 13:
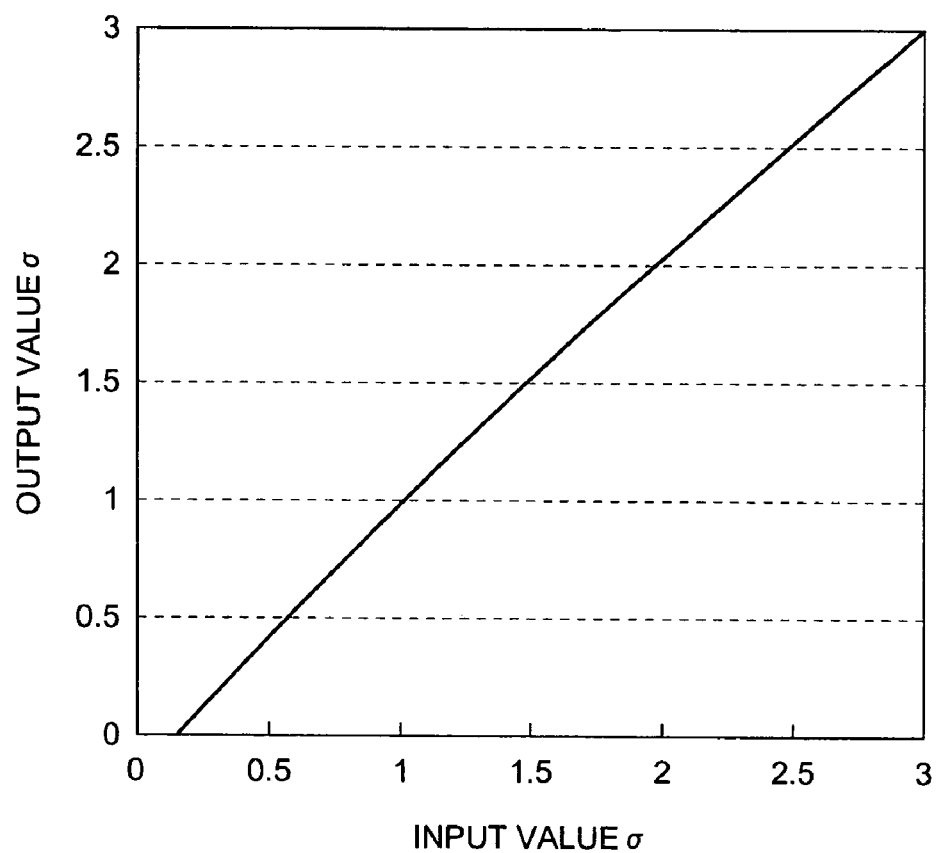
FIG. 13 is a drawing showing a condition of a coring processing.

FIG. 10 to FIG. 13 are graphs each showing a condition of a coring processing practiced in FIG. 7 and FIG. 8. FIG. 10 shows a coring condition for the high-frequency components of the level 1, and FIG. 11, FIG. 12, and FIG. 13 correspond to the level 2, level 3, and level 4 respectively. The x-axis in each graph represents the absolute value of an input signal before the coring processing, and the y-axis represents the absolute value of the output signal after the coring processing. For the ease of understanding, the values in the x-axis and y-axis are normalized by the standard deviation σ of the total input signal absolute values of the corresponding component. For example, the point where the value in respect of the x-axis is 1.96 corresponds to the point at 5% to the total as counted from the largest one in the case where the total signal values of the corresponding component are arranged in the order of the absolute value from the maximum to the smaller ones. Besides, in the case where the input signal is negative, by the use of the absolute value in the graph shown in any one of FIG. 10 to FIG. 13, the absolute value of the output signal is obtained, and by attaching a minus sign to it, an output value is obtained.

Figure 14:
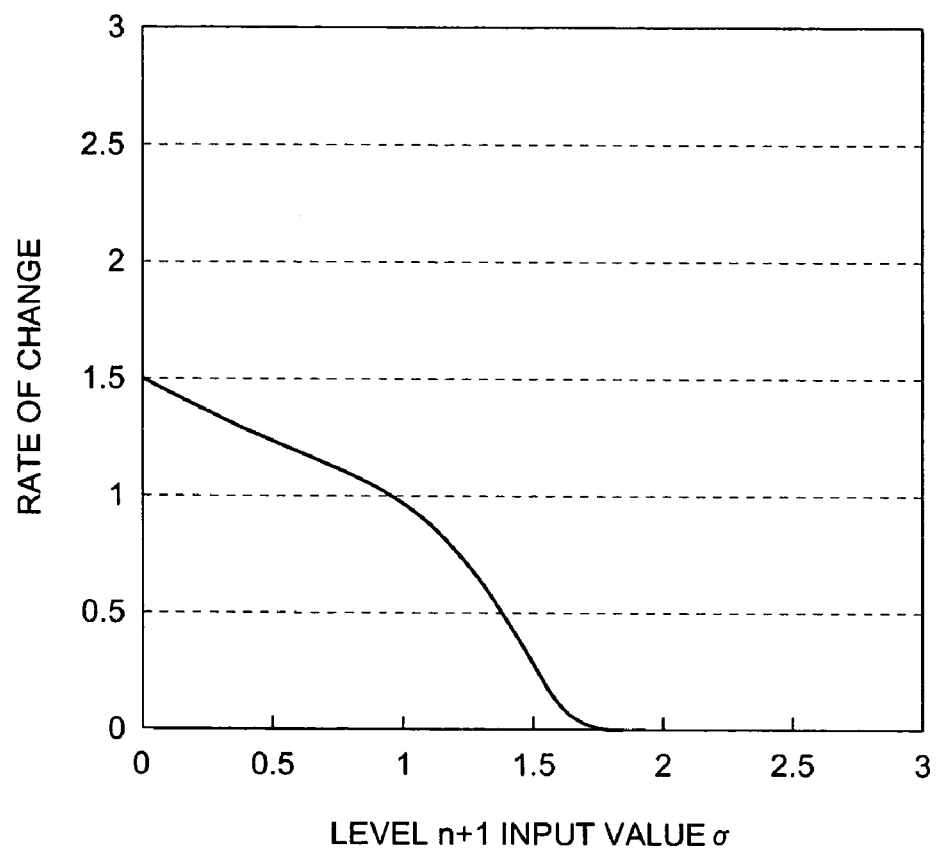
FIG. 14 is a drawing showing an example of changing a condition of a coring processing.

FIG. 14 shows an example in which a coring condition is changed with reference to the high-frequency component of the level (n+1) which is higher than the level n that is the object of the coring processing, with the coring condition shown in FIG. 10 to FIG. 13 taken as the basis. The x-axis of FIG. 14 represents the absolute value of the signal value at the corresponding coordinate of the corresponding high-frequency component of the level (n+1) which is higher than the level n that is the object of the coring processing. For the ease of understanding, this value is normalized on the basis of the standard deviation σ of the signal absolute value of the corresponding high-frequency component of the level (n+1). The value in respect of the y-axis represents the rate of change when the coring condition of the level n is changed with reference to the value of the level (n+1).

In the following, explanation will be given with it taken for instance a case where a multi-resolution transform is practiced by the use of a wavelet transform. It is assumed that the signal value at the coordinates (x, y) of the high-frequency component of the level 1 $YWv_1$ is 1.2 times of the standard deviation of the total signal values of the $YWv_1$. Because the value in respect of the y-axis corresponding to the point at the value 1.2 in respect of the x-axis is 0.5 in FIG. 10, the basic output value at the coordinates (x, y) of the high-frequency component of the level 1 $YWv_1$ is 0.5 time of the above-mentioned standard deviation. Now, it is assumed that the signal value at the coordinates (x/2, y/2) of the high-frequency component of the level 2 $YWv_2$ is 1.4 times of the standard deviation of the total signal values of the $YWv_2$. Because the value in respect of the y-axis corresponding to the point at the value 1.4 in respect of the x-axis is 0.5 in FIG. 14, the above-mentioned basic output value is adjusted by the rate of change 0.5. That is, (0.5−1.2)×0.5+1.2=0.85 is the signal value after the coring processing at the coordinates (x, y) of the high-frequency component of the level 1 $YWv_1$.

Figure 15:
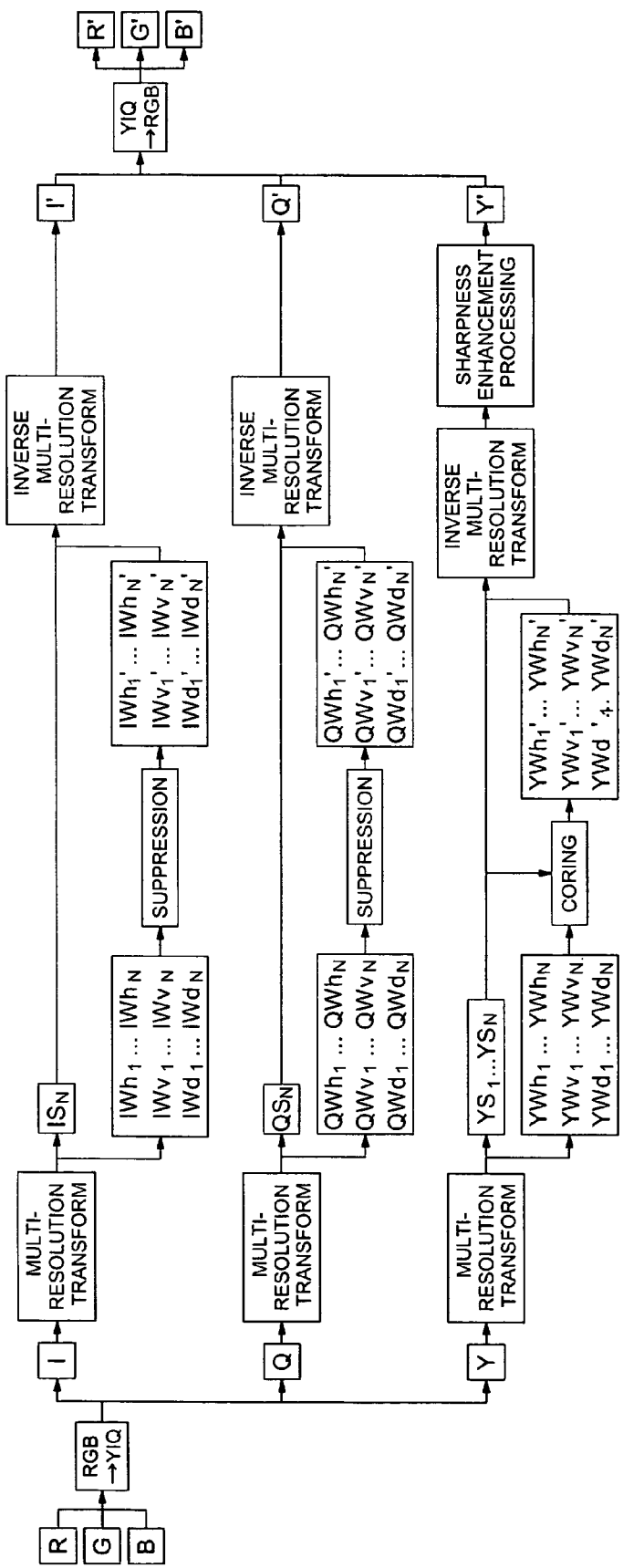
FIG. 15 is a system block diagram of another mode of practice of an internal processing of an image processing apparatus of this invention.
Figure 16:
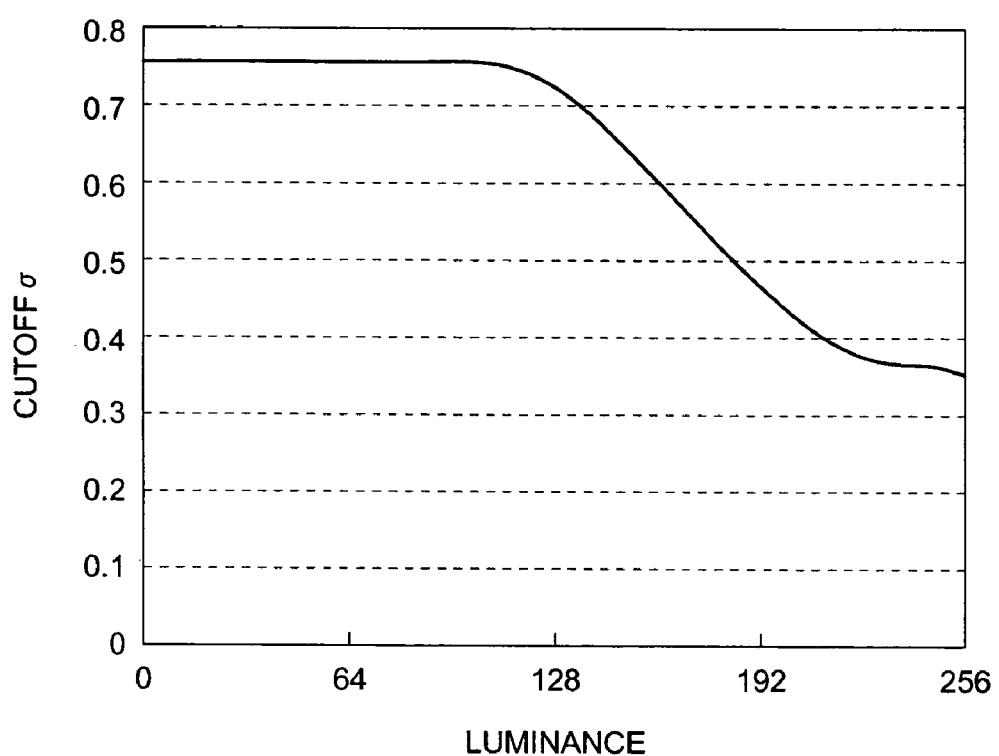
FIG. 16 is a drawing showing an example of setting to change the condition of a coring processing.
Figure 17:
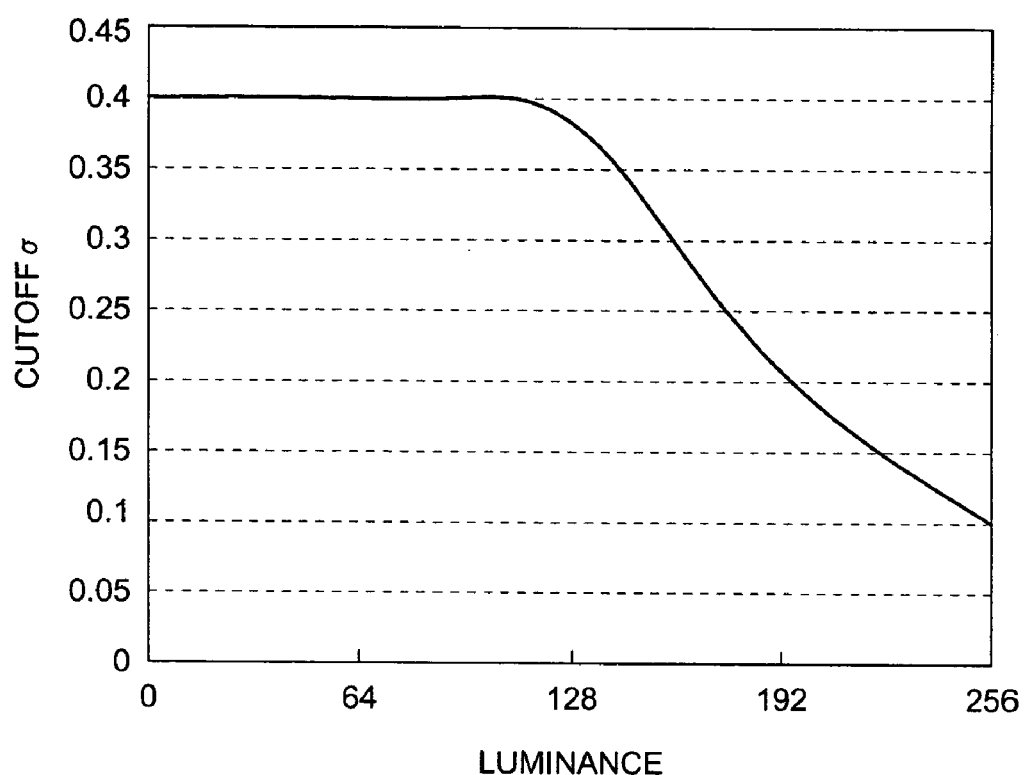
FIG. 17 is a drawing showing an example of setting to change the condition of a coring processing.
Figure 18:
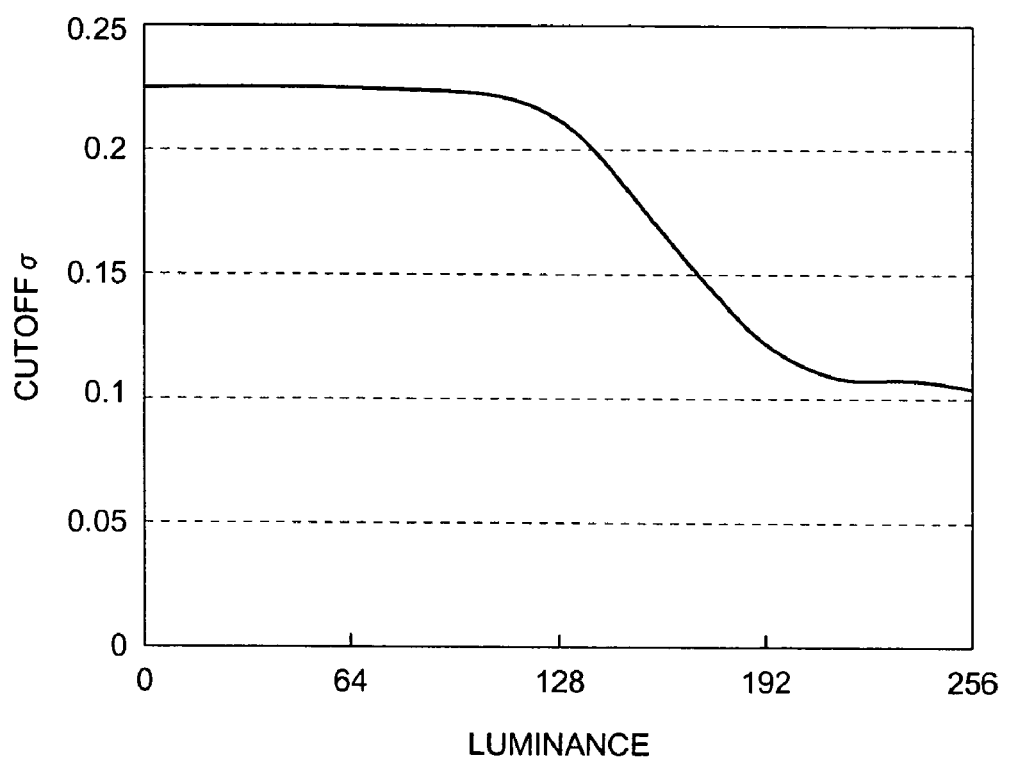
FIG. 18 is a drawing showing an example of setting to change the condition of a coring processing.
Figure 19:
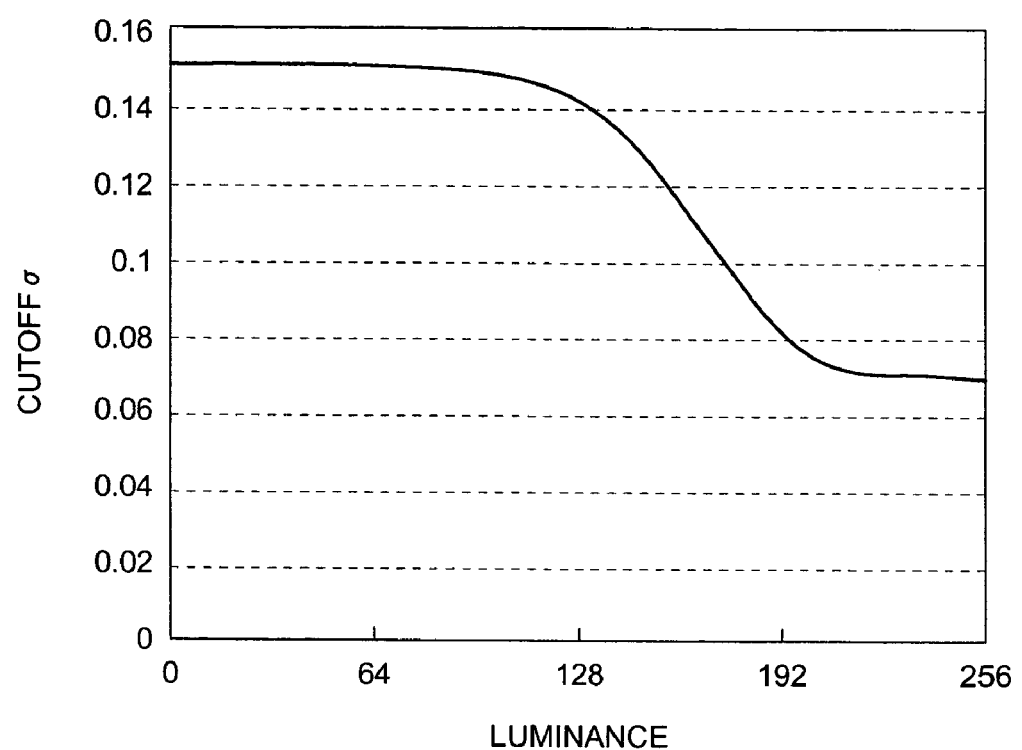
FIG. 19 is a drawing showing an example of setting to change the condition of a coring processing.

FIG. 15 shows a system block diagram of another mode of the internal processing of the image processing apparatus shown in FIG. 6. In this system, the low-frequency components of every level $YS_1$ to $YS_N$ are preserved in an multi-resolution transform of the Y signal, and in a coring processing of the high-frequency components of each level of the Y signal, the above-mentioned low-frequency components of every level $YS_1$ to $YS_N$ are referred to. FIG. 16 to FIG. 19 show examples of setting for changing the condition of a coring processing with reference to the low-frequency components $YS_1$ to $YS_N$.

FIG. 16 to FIG. 19 represent the settings of the level 1 to 4 respectively. The x-axis represents the signal value (expressed in 8 bits) of a low-frequency component, and the y-axis represents the cutoff value of the corresponding coring condition as normalized on the basis of the standard deviation. In the case where the absolute value of the signal value which is the object of the coring is not greater than the cutoff value, the signal value after the coring processing is made zero.

In the following, explanation will be given with it taken for instance a case where a multi-resolution transform is practiced by the use of a wavelet transform. It is assumed that the basic coring conditions of the high-frequency components of the level 1 to level 4 correspond to those shown in FIG. 10 to FIG. 13 respectively. For example, in applying a coring processing to the signal value at the coordinates (x, y) of the high-frequency component of the level 1 $YWv_1$, the signal value at the coordinates (x, y) of the corresponding low-frequency component of the level 1 $YS_1$ is referred to. If this signal value referred to is 210, the corresponding cutoff value is 0.4 in FIG. 16. On the other hand, the cutoff value of the basic coring condition of the high-frequency component of the level 1 shown in FIG. 10 is 0.7. Therefore, by multiplying the amount of shift of the curve of the basic coring condition from the straight line y=x by 0.4/0.7, the coring condition is modified to have a shape such that the cutoff value becomes 0.4.

Figure 20:
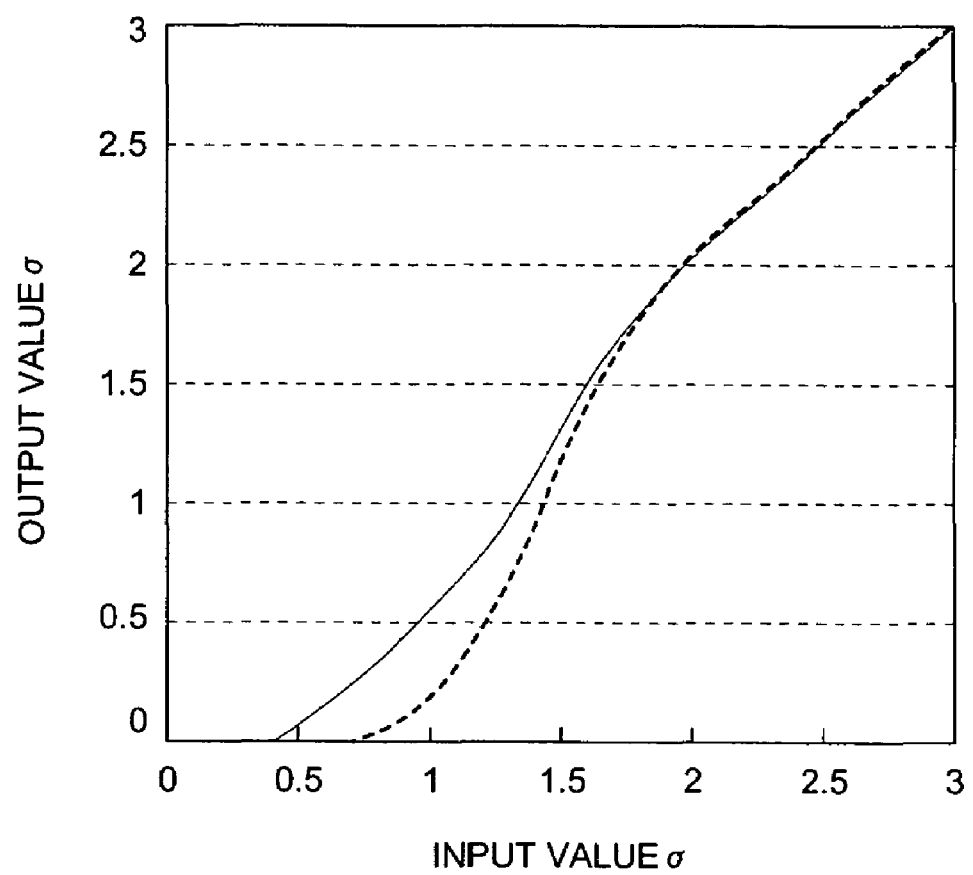
FIG. 20 is a drawing showing the result of the modification of the condition of a coring processing.

The result of this modification is shown in FIG. 20. The dotted line represents the basic coring condition, and the solid line represents the modified coring condition. If the signal value at the coordinates (x, y) of $YWv_1$ which is the object of the coring is 1.2 times of the standard deviation of the total values of $YWv_1$, the value in respect of the y-axis corresponding to the value 1.2 in respect of the x-axis in the modified coring condition shown in FIG. 20 is 0.8; therefore, the signal value after the coring is determined to be a value of the standard deviation multiplied by 0.8. In the above-mentioned example, the signal value of a low-frequency component of the same level as the high-frequency component which is the object of the coring is referred to, but this invention is not limited to this; for example, in applying a coring processing to the signal value at the coordinates (x, y) of the high-frequency component of the level 1 $YWv_1$, even by referring to the signal value at the coordinates (x/2, y/2) of the low-frequency component of the level 2 $YS_2$, the coring condition is controlled in the same way.

Figure 21:
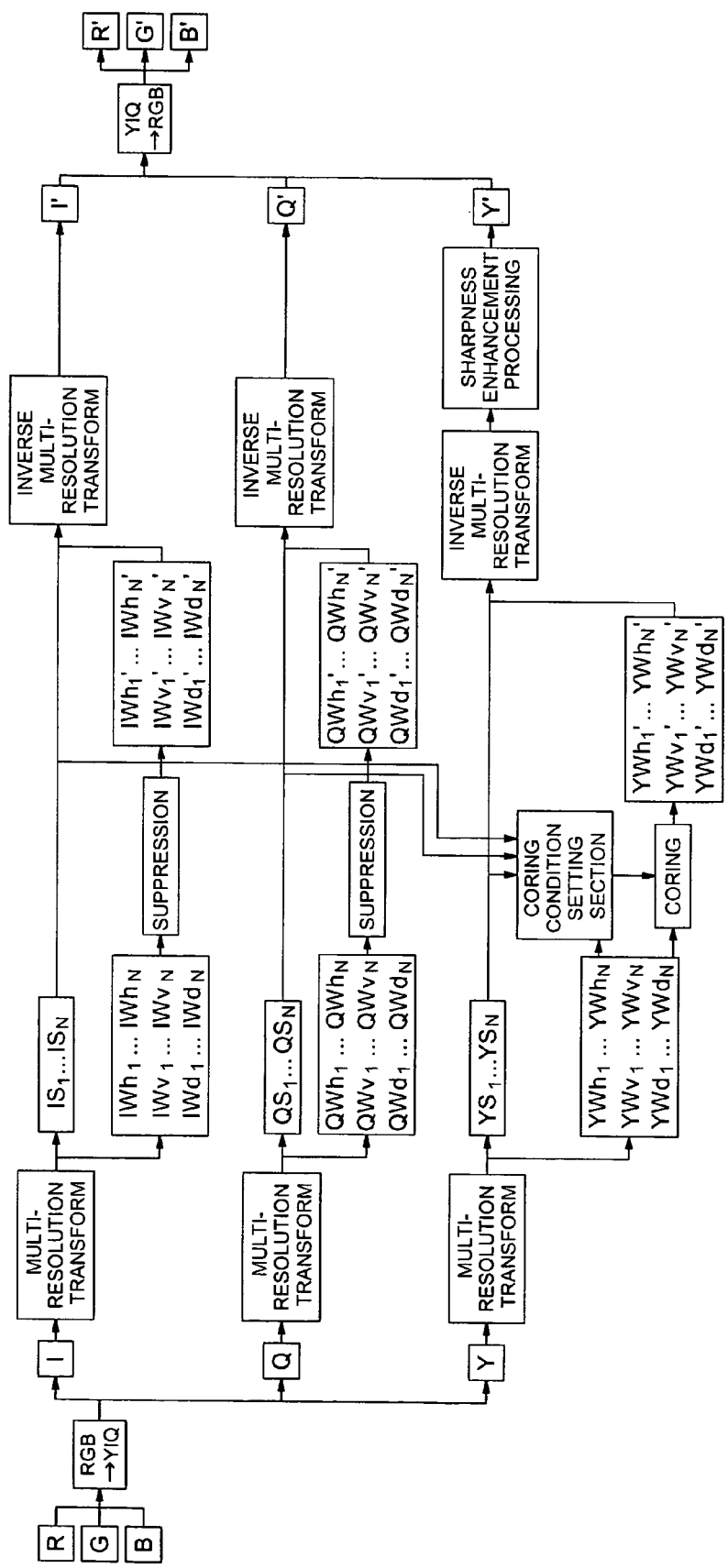
FIG. 21 is a system block diagram of further another mode of practice of an internal processing of an image processing apparatus of this invention.

FIG. 21 is a system block diagram of another mode of the internal processing of the image processing apparatus shown in FIG. 6. In this system, in applying a multi-resolution transform to Y, I, and Q signals, all of the low-frequency components of every level $YS_1$ to $YS_n$, $IS_1$ to $IS_n$, and $QS_1$ to $QS_n$ are preserved, and the signal values of those are referred to in a coring condition setting section. In the coring condition setting section, the values of the Y, I, and Q signals corresponding to the coordinates of the object of the coring are referred to, and from the hue and range of luminance of the signals, it is judged whether or not the object is a particular photographic object such as the face or the skin of a person, or the blue sky, and the basic coring condition is selected on the basis of the result of the judgement. Further, also the reference to a high-frequency component or a low-frequency component of a level higher than the object of the coring is carried out, the basic coring condition is changed by the method explained in the above, and the coring condition to be applied is determined and transmitted to a coring processing section. Following the condition transmitted, the coring processing section practices a coring processing of the luminance high-frequency components.

Figure 22:
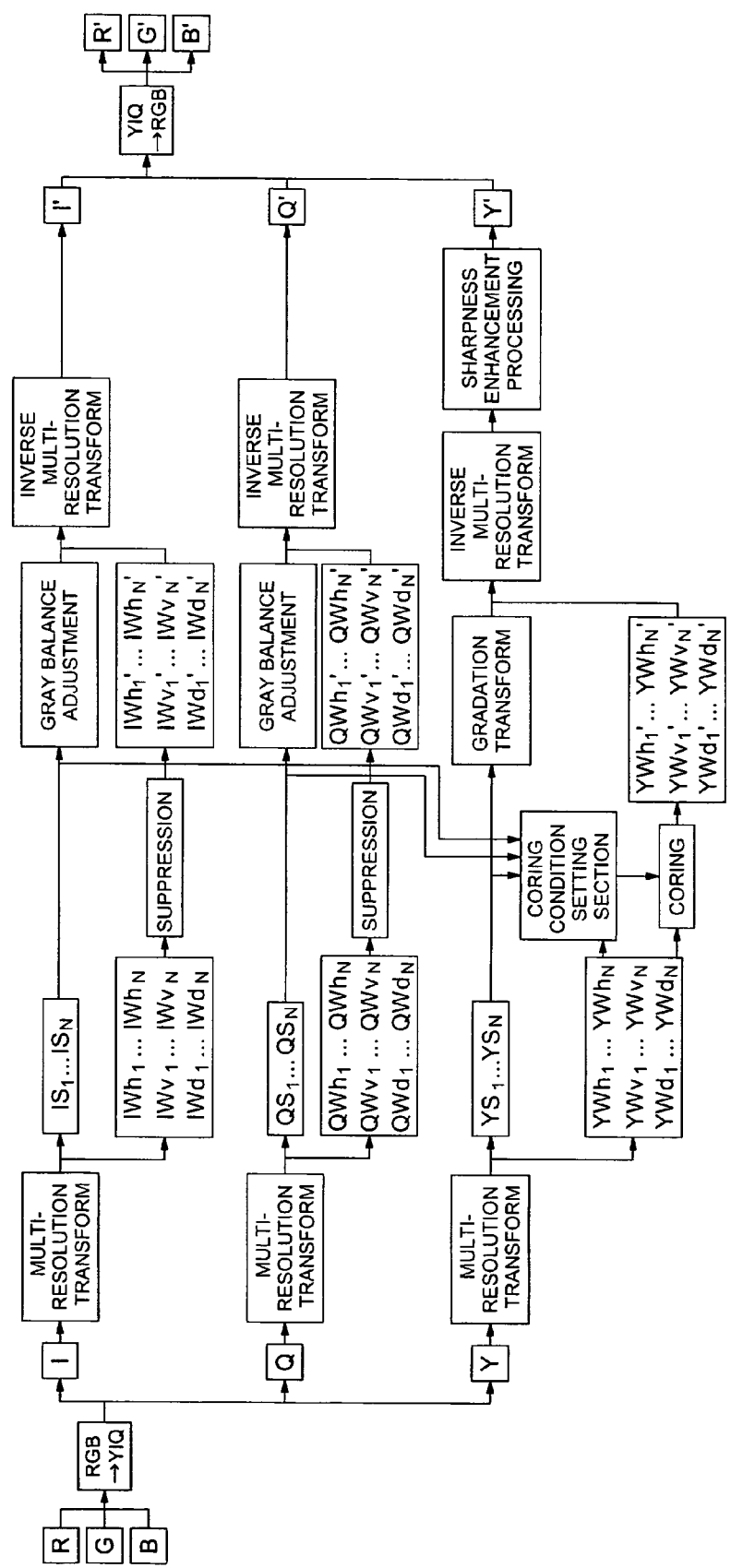
FIG. 22 is a system block diagram of furthermore another mode of practice of an internal processing of an image processing apparatus of this invention.

FIG. 22 is a system block diagram of further another mode of the internal processing of the image processing apparatus shown in FIG. 6. In this system, the low-frequency components of Y signal are used in an inverse multi-resolution transform after they have undergone a gradation adjustment by a gradation transforming means. Further, the low-frequency components of I and Q signals are used in an inverse multi-resolution transform after they have been adjusted by a gray balance adjusting means. In this mode of the invention, by controlling these gradation transforming means and gray balance adjusting means, it is possible to carry out a gradation adjustment and a gray balance adjustment rapidly by calculating again only the inverse multi-resolution transform.

In this invention, because a set of color image signals representing an original image is transformed into a luminance signal and color difference signals, a multi-resolution transform is applied to the color difference signals to transform them into color difference multi-resolution signals, and the high-frequency signals of the level 1 of said color difference multi-resolution signals are suppressed, a noise looking like colors being out of registration is effectively removed. On top of it, because suppression is not equally applied to the luminance multi-resolution signals, the degradation of sharpness accompanied by the removal of a noise looking like colors being out of registration can be prevented.

Further, by the application of a coring processing using a condition different for each level from other levels to the high-frequency signals of each level of the luminance multi-resolution signals, a granular noise is remarkably removed. This granular noise removal process is different from the method disclosed in the publication of the unexamined patent application H9-22460 in which a particular frequency band is equally suppressed, but is designed to selectively control only an area where a granular noise is present; therefore, an appearance of blur is not produced in the periphery of the bridge of the nose and around the eyes. In addition to the above-mentioned, because the amount of calculation required for this invention is much less than a technology in which a process for producing a blurred image by means of a large-sized two-dimensional filter is necessary, the processing time is shortened remarkably.

Further, by an effective utilization of the information on a multi-resolution transform, it is possible to effectively control an image processing condition through a wide-view analysis of an image without producing a new calculation load. As the result of that, on the basis of the above-mentioned situation, this invention is capable of suppressing a granular noise signal included in a color image signal as well as enhancing the sharpness of an image, while preserving the shade in the periphery of the bridge of the noise and that around the eyes, without producing a noise looking like colors being out of registration and a smooth expressionless makeup face, without producing a noise looking as if fine powders are scattered, and without producing a false-color contour in the vicinity of the edge or false-color spots in the flat portion.

The invention claimed is:

1. An image processing method, comprising:
    transforming a set of color image signals representing an original image into a luminance signal and color difference signals;
    transforming the luminance signal and the color difference signals separately into multi-resolution signals of level 1 to level N to produce luminance multi-resolution signals and color difference multi-resolution signals;
    applying an inverse multi-resolution transform to the color difference multi-resolution signals to produce processed color difference signals, after suppressing high-frequency components of the level 1 of the color difference multi-resolution signals;
    applying an inverse multi-resolution transform processing to the luminance multi-resolution signals to produce a processed luminance signal, after applying a coring processing using a condition for each level different from other levels to high-frequency signals of each level of the luminance multi-resolution signals;

transforming the processed luminance signal and the processed color difference signals into a set of processed color image signals.

2. The image processing method of claim 1, wherein the set of color image signals representing the original image are digital image signals obtained by scanning of a dye image formed on a silver halide film.

3. The image processing method of claim 1, wherein the coring processing to the luminance multi-resolution signals includes at least one processing which is practiced under a non-linear coring condition such that a rate of change for signal values of a higher rank corresponding to at least 5% of a total number of signal values with respect to an absolute value of an input signal becomes smaller than 10%, and a rate of change for signal values of a lower rank corresponding to at least 15% of the total number becomes substantially zero.

4. The image processing method of claim 1, wherein the condition for the coring processing of the luminance multi-resolution signals of the level n is changed with reference to a high-frequency signal of a higher level than n.

5. The image processing method of claim 1, wherein the condition for the coring processing of the luminance multi-resolution signal of the level n is such one as to preserve a low-frequency signal of each level generated in the multi-resolution transform, and to be changed with reference to the low-frequency signal of the level n.

6. The image processing method of claim 1, wherein the condition for the coring processing of the luminance multi-resolution signal of the level n is such one as to preserve a low-frequency signal of each level generated in the multi-resolution transform, and to be changed with reference to the low-frequency signal of a level higher than n.

7. The image processing method of claim 1, wherein luminance low-frequency signals and color difference low-frequency signals of each level generated in the multi-resolution transform of the luminance signal and the color difference signals are preserved;
wherein a condition of a photographic object is judged with reference to at least one of the luminance low-frequency signals, the color difference low-frequency signals, and a luminance high-frequency signal; and
wherein the condition of the coring processing is changed on the basis of a result of the judgement.

8. The image processing method of claim 1, further comprising:
applying a gradation transform to a luminance low-frequency image signal of a highest level, before applying the inverse multi-resolution transform processing.

9. The image processing method of claim 1, further comprising:
applying a gray-balance adjustment to color difference low-frequency image signals of a highest level, before applying the inverse multi-resolution transform.

10. An image processing method, comprising:
transforming a set of color image signals representing an original image into a luminance signal and color difference signals;
transforming the luminance signal and the color difference signals separately into multi-resolution signals of level 1 to level N to produce luminance multi-resolution signals and color difference multi-resolution signals;
applying an inverse multi-resolution transform to the color difference multi-resolution signals to produce processed color difference signals, after suppressing high-frequency components of the level 1 of the color difference multi-resolution signals;
applying an inverse multi-resolution transform processing to the luminance multi-resolution signals to produce a processed luminance signal, after applying a coring processing using a condition for each level different from other levels to high-frequency signals of each level of the luminance multi-resolution signals;
applying a sharpness enhancement processing to the processed luminance signal to produce a luminance signal of enhanced sharpness;
transforming the luminance signal of enhanced sharpness and the processed color difference signals into a set of processed color image signals.

11. The image processing method of claim 10, wherein the set of color image signals representing the original image are digital image signals obtained by scanning of a dye image formed on a silver halide film.

12. The image processing method of claim 10, wherein the coring processing to the luminance multi-resolution signals includes at least one processing which is practiced under a non-linear coring condition such that a rate of change for signal values of a higher rank corresponding to at least 5% of a total number of signal values with respect to an absolute value of an input signal becomes smaller than 10%, and a rate of change for signal values of a lower rank corresponding to at least 15% of the total number becomes substantially zero.

13. The image processing method of claim 10, wherein the condition for the coring processing of the luminance multi-resolution signals of the level n is changed with reference to a high-frequency signal of a higher level than n.

14. The image processing method of claim 10, wherein the condition for the coring processing of the luminance multi-resolution signal of the level n is such one as to preserve a low-frequency signal of each level generated in the multi-resolution transform, and to be changed with reference to the low-frequency signal of the level n.

15. The image processing method of claim 10, wherein the condition for the coring processing of the luminance multi-resolution signal of the level n is such one as to preserve a low-frequency signal of each level generated in the multi-resolution transform, and to be changed with reference to the low-frequency signal of a level higher than n.

16. The image processing method of claim 10, wherein luminance low-frequency signals and color difference low-frequency signals of each level generated in the multi-resolution transform of the luminance signal and the color difference signals are preserved;
wherein a condition of a photographic object is judged with reference to at least one of the luminance low-frequency signals, the color difference low-frequency signals, and a luminance high-frequency signal; and
wherein the condition of the coring processing is changed on the basis of a result of the judgement.

17. The image processing method of claim 10, further comprising:
applying a gradation transform to a luminance low-frequency image signal of a highest level, before applying the inverse multi-resolution transform processing.

18. The image processing method of claim 10, further comprising:
applying a gray-balance adjustment to color difference low-frequency image signals of a highest level, before applying the inverse multi-resolution transform.

19. An image processing apparatus comprising:
a first transforming device which transforms a set of color image signals, representing an original image, into a luminance signal and color difference signals;
a second transforming device which transforms the luminance signal and the color difference signals separately into multi-resolution signals of level 1 to level N to produce luminance multi-resolution signals and color difference multi-resolution signals;
a third transforming device which applies an inverse multi-resolution transform to the color difference multi-resolution signals to transform them into processed color difference signals, after suppressing high-frequency signals of the level 1 of said color difference multi-resolution signals;
a coring processing device which applies a coring processing using a condition for each level different from other levels to high-frequency signals of each level of the luminance multi-resolution signals;
a fourth transforming device which applies the inverse multi-resolution transform to the luminance multi-resolution signals, having already undergone the coring processing, to transform them into a processed luminance signal; and
a fifth transforming device which transforms the processed luminance signal and the processed color difference signals into a set of processed color image signals.

20. The image processing apparatus of claim 19, wherein the set of color image signals representing the original image are digital image signals obtained by scanning of a dye image formed on a silver halide film.

21. The image processing apparatus of claim 19, wherein the coring processing device includes at least one processing means which performs under a non-linear coring condition such that a rate of change for signal values of a higher rank corresponding to at least 5% of a total number of signal values with respect to an absolute value of an input signal becomes smaller than 10%, and a rate of change for signal values of a lower rank corresponding to at least 15% of the total number becomes substantially zero.

22. The image processing apparatus of claim 19, wherein the condition for the coring processing of the luminance multi-resolution signals of the level n is changed with reference to a high-frequency signal of a higher level than n.

23. The image processing apparatus of claim 19, wherein the condition for the coring processing of the luminance multi-resolution signal of the level n is such one as to preserve a low-frequency signal of each level generated in the multi-resolution transform, and to be changed with reference to the low-frequency signal of the level n.

24. The image processing apparatus of claim 19, wherein the condition for the coring processing of the luminance multi-resolution signal of the level n is such one as to preserve a low-frequency signal of each level generated in the multi-resolution transform, and to be changed with reference to the low-frequency signal of a level higher than n.

25. The image processing apparatus of claim 19, further comprising:
a preserving device which preserves luminance low-frequency signals and color difference low-frequency signals of each level generated in the multi-resolution transform of the luminance signal and the color difference signals;
a judgment device which judges a condition of a photographic object with reference to at least one of the luminance low-frequency signals, the color difference low-frequency signals, and a luminance high-frequency signal; and
a condition changing device which changes the condition of the coring processing on the basis of a result of the judgment.

26. The image processing apparatus of claim 19, further comprising:
a gradation transforming device which applies a gradation transform to a luminance low-frequency image signal of a highest level, before applying the inverse multi-resolution transform.

27. The image processing apparatus of claim 19, further comprising:
a gray-balance adjusting device which applies a gray-balance adjustment to color difference low-frequency image signals of a highest level before applying the inverse multi-resolution transform.

28. An image processing apparatus comprising:
a first transforming device which transforms a set of color image signals representing an original image into a luminance signal and color difference signals;
a second transforming device which transforms the luminance signal and the color difference signals separately into multi-resolution signals of level 1 to level N to produce luminance multi-resolution signals and color difference multi-resolution signals;
a third transforming device which applies an inverse multi-resolution transform to the color difference multi-resolution signals to transform them into processed color difference signals, after suppressing high-frequency signals of the level 1 of said color difference multi-resolution signals;
a coring processing device which applies a coring processing using a condition for each level different from other levels to high-frequency signals of each level of the luminance multi-resolution signals;
a fourth transforming device which applies the inverse multi-resolution transform to the luminance multi-resolution signals, having already undergone the coring processing, to transform them into a processed luminance signal;
a sharpness enhancing device which applies a sharpness enhancement processing to the processed luminance signal to produce a luminance signal of enhanced sharpness; and
a fifth transforming device which transforms the luminance signal of enhanced sharpness and the processed color difference signals into a set of processed color image signals.

29. The image processing apparatus of claim 28, wherein the set of color image signals representing the original image are digital image signals obtained by scanning of a dye image formed on a silver halide film.

30. The image processing apparatus of claim 20, wherein the coring processing device includes at least one processing means which performs under a non-linear coring condition such that a rate of change for signal values of a higher rank corresponding to at least 5% of a total number of signal values with respect to an absolute value of an input signal becomes smaller than 10%, and a rate of change for signal values of a lower rank corresponding to at least 15% of the total number becomes substantially zero.

31. image processing apparatus of claim 28, wherein the condition for the coring processing of the luminance multi-resolution signals of the level n is changed with reference to a high-frequency signal of a higher level than n.

32. The image processing apparatus of claim 28, wherein the condition for the coring processing of the luminance multi-resolution signal of the level n is such one as to preserve a low-frequency signal of each level generated in the multi-resolution transform, and to be changed with reference to the low-frequency signal of the level n.

33. The image processing apparatus of claim 28, wherein the condition for the coring processing of the luminance multi-resolution signal of the level n is such one as to preserve a low-frequency signal of each level generated in the multi-resolution transform, and to be changed with reference to the low-frequency signal of a level higher than n.

34. The image processing apparatus of claim 28, further comprising:
    a preserving device which preserves luminance low-frequency signals and color difference low-frequency signals of each level generated in the multi-resolution transform of the luminance signal and the color difference signals;
    a judgment device which judges a condition of a photographic object with reference to at least one of the luminance low-frequency signals, the color difference low-frequency signals, and a luminance high-frequency signal; and
    a condition changing device which changes the condition of the coring processing on the basis of a result of the judgment.

35. The image processing apparatus of claim 28, further comprising:
    a gradation transforming device which applies a gradation transform to a luminance low-frequency image signal of a highest level, before applying the inverse multi-resolution transform.

36. The image processing apparatus of claim 28, further comprising:
    a gray-balance adjusting device which applies a gray-balance adjustment to color difference low-frequency image signals of a highest level before applying the inverse multi-resolution transform.

37. A computer-readable storage medium having a program stored thereon that is executable by a computer to cause the computer to function as an image processing apparatus comprising:
    a first transforming device which transforms a set of color image signals, representing an original image, into a luminance signal and color difference signals;
    a second transforming device which transforms the luminance signal and the color difference signals separately into multi-resolution signals of level 1 to level N to produce luminance multi-resolution signals and color difference multi-resolution signals;
    a third transforming device which applies an inverse multi-resolution transform to the color difference multi-resolution signals to transform them into processed color difference signals, after suppressing high-frequency signals of the level 1 of said color difference multi-resolution signals;
    a coring processing device which applies a coring processing using a condition for each level different from other levels to high-frequency signals of each level of the luminance multi-resolution signals;
    a fourth transforming device which applies the inverse multi-resolution transform to the luminance multi-resolution signals, having already undergone the coring processing, to transform them into a processed luminance signal; and
    a fifth transforming device which transforms the processed luminance signal and the processed color difference signals into a set of processed color image signals.

38. The computer-readable storage medium of claim 37, wherein the set of color image signals representing the original image are digital image signals obtained by scanning of a dye image formed on a silver halide film.

39. The computer-readable storage medium of claim 37, wherein the coring processing device includes at least one processing means which performs under a non-linear coring condition such that a rate of change for signal values of a higher rank corresponding to at least 5% of a total number of signal values with respect to an absolute value of an input signal becomes smaller than 10%, and a rate of change for signal values of a lower rank corresponding to at least 15% of the total number becomes substantially zero.

40. The computer-readable storage medium of claim 37, wherein the condition for the coring processing of the luminance multi-resolution signals of the level n is changed with reference to a high-frequency signal of a higher level than n.

41. The computer-readable storage medium of claim 37, wherein the condition for the coring processing of the luminance multi-resolution signal of the level n is such one as to preserve a low-frequency signal of each level generated in the multi-resolution transform, and to be changed with reference to the low-frequency signal of the level n.

42. The computer-readable storage medium of claim 37, wherein the condition for the coring processing of the luminance multi-resolution signal of the level n is such one as to preserve a low-frequency signal of each level generated in the multi-resolution transform, and to be changed with reference to the low-frequency signal of a level higher than n.

43. A computer-readable storage medium of claim 37, wherein the image processing apparatus further comprises:
    a preserving device which preserves luminance low-frequency signals and color difference low-frequency signals of each level generated in the multi-resolution transform of the luminance signal and the color difference signals;
    a judgment device which judges a condition of a photographic object with reference to at least one of the luminance low-frequency signals, the color difference low-frequency signals, and a luminance high-frequency signal; and
    a condition changing device which changes the condition of the coring processing on the basis of a result of the judgment.

44. The computer-readable storage medium of claim 37, wherein the image processing apparatus further comprises a gradation transforming device which applies a gradation transform to a luminance low-frequency image signal of a highest level, before applying the inverse multi-resolution transform.

45. The computer-readable storage medium of claim 37, wherein the image processing apparatus further comprises a gray-balance adjusting device which applies a gray-balance adjustment to color difference low-frequency image signals of a highest level before applying the inverse multi-resolution transform.

46. A computer-readable storage medium having a program stored thereon that is executable by a computer to cause the computer to function as an image processing apparatus comprising:

a first transforming device which transforms a set of color image signals representing an original image into a luminance signal and color difference signals;

a second transforming device which transforms the luminance signal and the color difference signals separately into multi-resolution signals of level 1 to level N to produce luminance multi-resolution signals and color difference multi-resolution signals;

a third transforming device which applies an inverse multi-resolution transform to the color difference multi-resolution signals to transform them into processed color difference signals, after suppressing high-frequency signals of the level 1 of said color difference multi-resolution signals;

a coring processing device which applies a coring processing using a condition for each level different from other levels to high-frequency signals of each level of the luminance multi-resolution signals;

a fourth transforming device which applies the inverse multi-resolution transform to the luminance multi-resolution signals, having already undergone the coring processing, to transform them into a processed luminance signal;

a sharpness enhancing device which applies a sharpness enhancement processing to the processed luminance signal to produce a luminance signal of enhanced sharpness; and a fifth transforming device which transforms the luminance signal of enhanced sharpness and the processed color difference signals into a set of processed color image signals.

47. The computer-readable storage medium of claim 46, wherein the set of color image signals representing the original image are digital image signals obtained by scanning of a dye image formed on a silver halide film.

48. The computer-readable storage medium of claim 46, wherein the coring processing device includes at least one processing means which performs under a non-linear coring condition such that a rate of change for signal values of a higher rank corresponding to at least 5% of a total number of signal values with respect to an absolute value of an input signal becomes smaller than 10%, and a rate of change for signal values of a lower rank corresponding to at least 15% of the total number becomes substantially zero.

49. The computer-readable storage medium of claim 46, wherein the condition for the coring processing of the luminance multi-resolution signals of the level n is changed with reference to a high-frequency signal of a higher level than n.

50. The computer-readable storage medium of claim 46, wherein the condition for the coring processing of the luminance multi-resolution signal of the level n is such one as to preserve a low-frequency signal of each level generated in the multi-resolution transform, and to be changed with reference to the low-frequency signal of the level n.

51. The computer-readable storage medium of claim 46, wherein the condition for the coring processing of the luminance multi-resolution signal of the level n is such one as to preserve a low-frequency signal of each level generated in the multi-resolution transform, and to be changed with reference to the low-frequency signal of a level higher than n.

52. A computer-readable storage medium of claim 46, wherein the image processing apparatus further comprises:

a preserving device which preserves luminance low-frequency signals and color difference low-frequency signals of each level generated in the multi-resolution transform of the luminance signal and the color difference signals;

a judgment device which judges a condition of a photographic object with reference to at least one of the luminance low-frequency signals, the color difference low-frequency signals, and a luminance high-frequency signal; and a condition changing device which changes the condition of the coring processing on the basis of a result of the judgment.

53. The computer-readable storage medium of claim 46, wherein the image processing apparatus further comprises a gradation transforming device which applies a gradation transform to a luminance low-frequency image signal of a highest level, before applying the inverse multi-resolution transform.

54. The computer-readable storage medium of claim 46, wherein the image processing apparatus further comprises a gray-balance adjusting device which applies a gray-balance adjustment to color difference low-frequency image signals of a highest level before applying the inverse multi-resolution transform.

* * * * *